United States Patent [19]
Hassett et al.

[11] Patent Number: 5,857,067
[45] Date of Patent: Jan. 5, 1999

[54] INTELLIGENT FONT RENDERING CO-PROCESSOR

[75] Inventors: Christopher R. Hassett; Harry J. Collins, both of Cupertino; John W. Nogrady, Santa Clara, all of Calif.

[73] Assignee: Adobe Systems, Inc., Mountain View, Calif.

[21] Appl. No.: 172,534

[22] Filed: Dec. 23, 1993

Related U.S. Application Data

[62] Division of Ser. No. 767,259, Sep. 27, 1991, Pat. No. 5,301,267.

[51] Int. Cl.$^6$ ............................................. G06T 11/00
[52] U.S. Cl. ............................................. 395/150; 395/142
[58] Field of Search ............................ 395/150, 151, 395/142, 143; 345/144, 192

[56] References Cited

U.S. PATENT DOCUMENTS

| | | |
|---|---|---|
| 4,675,830 | 6/1987 | Hawkins ............................ 395/151 |
| 4,949,281 | 8/1990 | Hillenbrand et al. ............... 395/142 |
| 5,222,207 | 6/1993 | Yamada et al. ..................... 395/142 |
| 5,241,654 | 8/1993 | Kai et al. ............................ 395/142 |
| 5,269,000 | 12/1993 | Ohuchi ............................... 395/142 |
| 5,309,521 | 5/1994 | Matsukawa ......................... 382/22 |

*Primary Examiner*—Heather R. Herndon
*Assistant Examiner*—J. H. Feild
*Attorney, Agent, or Firm*—Fish & Richardson P.C.

[57] ABSTRACT

A method and apparatus convert font outlines to rasterized bitmaps. The method accesses stored outline data representing an object in a first coordinate space and transforms the outline data to corresponding data representing the object in a second corrdinate space. Regional relationship information is maintained in both corrdinate spaces through a non-linear transformation expressed as a plurality of linear transformation matrices, and a bit map, suitable for displaying the object, is generated as a result of the transformation. The apparatus of the invention analyzes Bezier curves and subdivides them as necessary until each portion is sufficiently flat to be approximated as a straight line, and calculates where line segments cross pixel midlines in order to fill the outline, and then generates the bit map.

4 Claims, 20 Drawing Sheets

INTELLIGENT FONT RENDERING CO-PROCESSOR

This is a divisional of application Ser. No. 07/767,259 filed Sep. 27, 1991, U.S. Pat. No. 5,301,267.

FIELD OF THE INVENTION

The device of this invention is a control device for high performance, high quality display devices used in typesetters, image-setters, color printers, laser printers and video displays. The device is preferably a single chip. The control device is useful in interpreting font outlines, including rendering hints, and translating hints and outlines to provide rasterized bit maps of characters filled with black, white or other colors or patterns.

BACKGROUND

Rendering an image on a raster display requires the formation of the raster image at some point in the printing process. In the case of characters, a raster bit map of each needed character can be stored in memory and then simply copied from memory to a printer input buffer whenever that character is required. A complete set of characters can be maintained in memory, but this requires storing each particular character in every needed point size and resolution, which can use up large quantities of memory. Alternatively, a set of characters can be encoded in some way, then converted into a bit map for a particular size character at a particular resolution appropriate for a selected display device. Characters which will be reused can be stored in cache memory to facilitate faster printing. A typical printing job requires a full set of lower case characters and many but not all capital letters at a single size and resolution. Thus bit maps of each of these characters can be generated and held in cache memory for the duration of the job, after which the cache memory can be flushed and filled with characters needed for the next job. Typical printer memory can accommodate a small number of fonts, enough for a simple job. When a job calls for a large number of fonts and/or point sizes, the capacity of cache memory may be exceeded, requiring some character bit maps to be generated multiple times.

In a preferred embodiment, the device is used to convert PostScript® Type 1 font outlines to bit maps. PostScript was developed by Adobe Systems Inc. (hereinafter "Adobe"), the assignee of the subject invention. The PostScript system was developed to communicate high-level graphic information to digital laser printers. It is a flexible, compact and powerful language for rendering characters from stored outline fonts, for expressing graphic regions and for performing general programming tasks. The preferred embodiment of the device of this invention is described in the context of a PostScript printer, typesetter or image-setter.

The PostScript language, use and applications are thoroughly described in a number of books published by Adobe, including POSTSCRIPT LANGUAGE REFERENCE MANUAL (Second Edition, 1990) and POSTSCRIPT LANGUAGE PROGRAM DESIGN (1988), each of which is incorporated herein by reference. PostScript and related page description languages are useful with typesetters, image-setters, color printers and high throughput printers as well as high-resolution video or other display devices.

The present invention is useful in many currently available printing environments. Outline fonts are used in conjunction with many typesetting and printing combinations, using Apple® Macintosh®, IBM® PC, Sun® and other UNIX-based computers with one or more of several marking (printing) or display devices. Current software includes Adobe's PostScript and ATM™ software and hardware, and outline font programs from Bitstream and Compugraphic. Page description languages used to control printers include Adobe's PostScript language, Hewlett Packard's PCL, Canon's LIPS, NEC's NPDL and other languages by Kyocera and Xerox.

Printers, video display and other such devices are sometimes called marking devices or marking engines. A raster image processor (RIP) associated with a marking engine converts input information and commands into a rasterized (bit-mapped) region suitable for display on the associated output device. Commercially available devices include the Apple LaserWriter®, the Linotronic® 100 and 300, the Adobe Atlas RIP, the Emerald RIP and Hewlett-Packard DeskWriter™ and LaserJet™. A marking engine generally prints characters from stored bit maps by simply transferring the pattern of bits from memory to the output device. This requires a bit map of the character in the correct size and resolution.

The main advantage of outline fonts over bit mapped fonts is also the main disadvantage. An outline font can be used to generate a bit map for a character of any size from a single outline font. This provides flexibility and compact storage, but costs time in preparing each required bit map and incurs the added burden of ensuring that all bit map renditions have aesthetic appeal. A bit mapped font can be specifically edited to produce optimal results, but only for a specific size. Additional sizes require additional bit maps. Bit mapped fonts have traditionally enjoyed a speed advantage as well in that the bit map can be printed directly. The trade-off is speed vs. storage capacity requirements.

Essentially all programs using outline fonts must convert outline information into a bit map before printing a character on a raster printer. In a typical application, outlines are defined in a high resolution coordinate system, generally called character space. In order to print on a marking engine, the outline must be scaled to the required size and mapped to a coordinate system appropriate for the marking engine. The second coordinate space is generally called device space. The outline in device space is filled with a series of pixels to approximate the original outline. Characters may be adjusted or "hinted" in either character space or device space to improve alignment of the final character on the device space pixel grid.

Previous methods of converting character outlines to scaled character bit maps were software based, which allowed flexibility but significantly limited the speed at which character bit maps could be generated. The limitations of software based renderers become particularly acute for printing jobs which require a large number of different fonts or sizes, since each character at each size in each font must be available to the marking engine as a bit map. If a required character is not available in the required size and font, then the corresponding outline must be adjusted and converted. The limitations of software-based renderers are also significant in printing foreign languages such as Japanese which use a large number of characters with only limited repetition. Each time a character bit map is not available in cache memory, a new bit map must be generated. The bit map is usually stored, displacing a previously stored character bit map if the available memory is full.

The problem of scaling outlines to produce bit maps has been a challenge for many years. Many of the problems of analyzing outlines to produce bit maps at an arbitrary scale have been solved in the Adobe ATM product. The methods used in ATM are described in U.S. patent application Ser. Nos. 388,336 and 388,339 by Paxton et al. and Nos. 539,222 and 552,788 by Byron et al., all assigned to Adobe and all incorporated herein by reference. Some of the methods described therein, such as analyzing outlines, identifying crosses and tracing paths have been improved and form the basis for the present invention.

SUMMARY OF THE INVENTION

The present invention provides an apparatus and method for converting font outlines to rasterized bit maps. One method for displaying rasterized objects begins by accessing outline data, representing the object in a first coordinate space, from computer memory or storage, then transforms the outline data to corresponding data representing the object in a second coordinate space, where regional relationship information in the outline data in the first coordinate space is maintained in the second coordinate space. This method includes: a) transforming the outline data of an object from the representation in a first coordinate space to an initial representation in a second coordinate space using a linear transformation; b) applying the regional relationship data primarily to the representation of the object in the second coordinate space to derive a non-linear transformation expressed as a plurality of linear transformation matrices; c) applying the non-linear transformation to outline data of the object in first coordinate space to derive a second representation in second coordinate space; d) converting the second representation of the outline data of the object in the second coordinate space to raster data describing the object in a form suitable for display; and e) storing the raster data or displaying the object on a raster device.

From another perspective, the method scales an outline of an object in a first coordinate space to a second coordinate space, after first accessing outline information from storage. It then identifies the coordinates of one or more select points at first coordinates in the second coordinate space and compares those coordinates with desired or preselected coordinates in the second coordinate space, measuring the difference in the second coordinate space for the desired versus the actual coordinates. The method then derives a non-linear transformation approximated by a plurality of piecewise linear transformation matrices and applies an appropriate linear transformation matrix to convert the outline from first coordinate space directly to adjusted second coordinate space. Finally, the method fills and stores the outline of the object in a form suitable for display on a raster device and may display the outline.

To convert curved outlines to straight line segments suitable for calculating the desired bit map, this invention includes a method using four parallel adders for each dimension to perform a midpoint subdivision and flatness test on a Bezier curve, which is defined by a first set of control points. The control points are normalized using a first control point as a reference. The Bezier curve is divided approximately at its midpoint into second and third Bezier curves and is tested for flatness by determining whether the distance between each internal control point and the closest endpoint is within ⅓ the net endpoint-to-endpoint distance plus a flatness factor, which, for example, might be one-half the width of a pixel.

Once the outline has been reduced to a series of line segments, each line segment is examined to see whether and where it crosses midlines between pixel centers. Subdividing the pixel into subunits facilitates calculating the final bit maps. The apparatus of the invention offers several advantages over the prior art use of software by simplifying scaling and subdividing line segments. The scaled segments which cross midlines are tested to see in what subdivision of the pixel the cross occurred, and the information about these crosses is compiled and correlated to effect center fill of the outlined image, with both dropout and collision control.

DETAILED DESCRIPTION OF THE INVENTION

The method and apparatus of this invention is particularly useful for converting character outlines into bitmaps suitable for display on a raster printing or display device. Outlines are generally defined at a very high resolution in character space, frequently set to be 1000 pixels high for each character. A character outline may be defined as a series of lines and curves starting at a certain point on a pixel grid. See generally ADOBE TYPE 1 FONT FORMAT (the "Black Book", 1990). The outline generally must be transformed to display space, which generally has units equal to the maximum resolution available on a selected display device. The outline is scaled to a requested size, rendered as a bit map and displayed on the selected display device.

Figure 1:
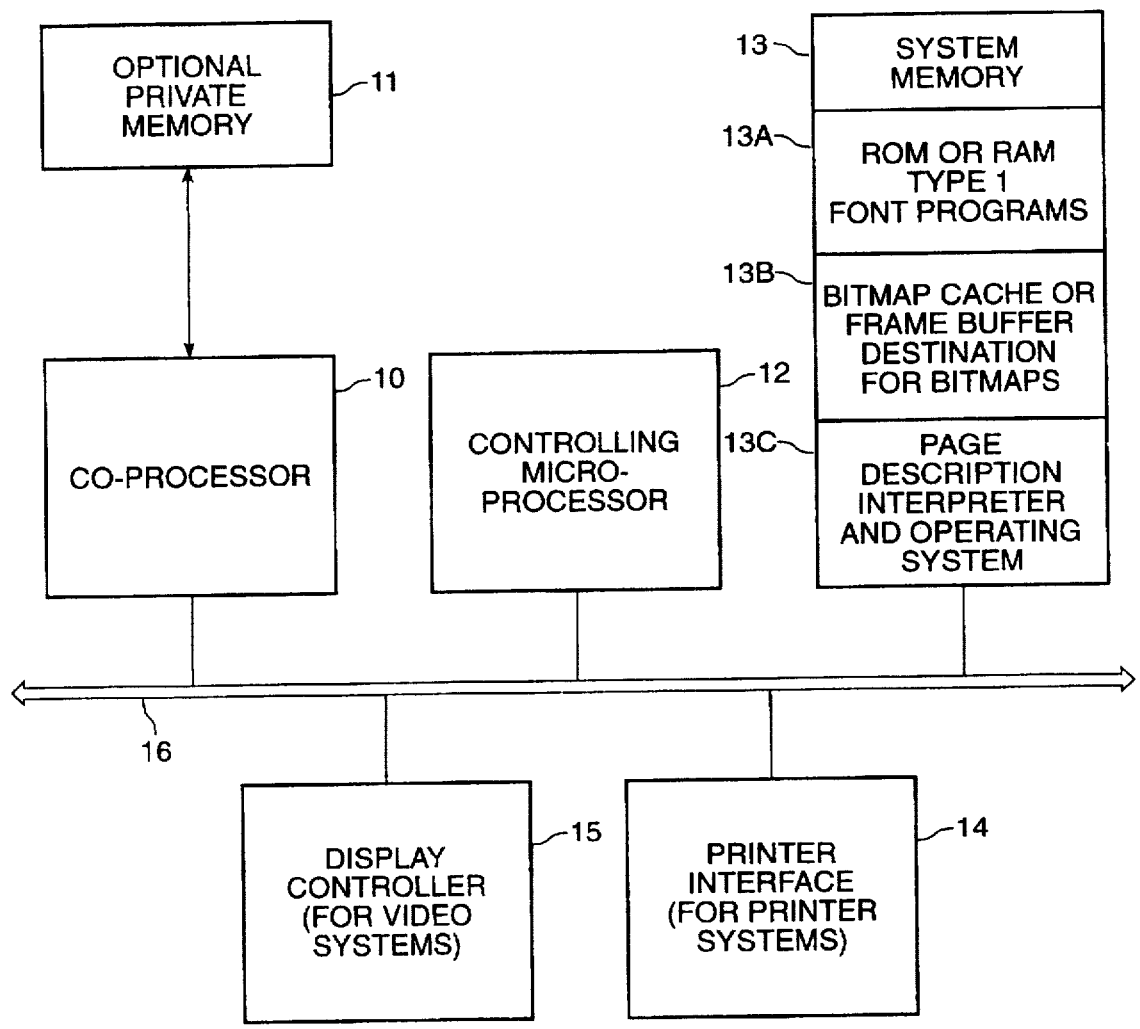
FIG. 1 illustrates generally how the apparatus of this invention is connected to other components of a graphics processing system.

The apparatus of this invention is designed for incorporation in a single chip co-processor to be used in conjunction with a microprocessor in a raster printer controller. For convenience, the preferred embodiment of the present invention will be referred to as the font rendering co-processor hereinafter called the "FRC". Referring to FIG. 1, co-processor 10 is connected to main bus 16 of a printing or display device, and thereby connected to controlling microprocessor 12 and system memory 13. Co-processor 10 can be connected to and can use optional private cache memory 11 or it can contain internal memory or use system memory 13 for storing intermediate and final values. The apparatus may include a display controller 15 (for video systems) and/or printer interface 14 (for printer systems) to drive appropriate output devices, which are well known to one skilled in the art.

Figure 2:
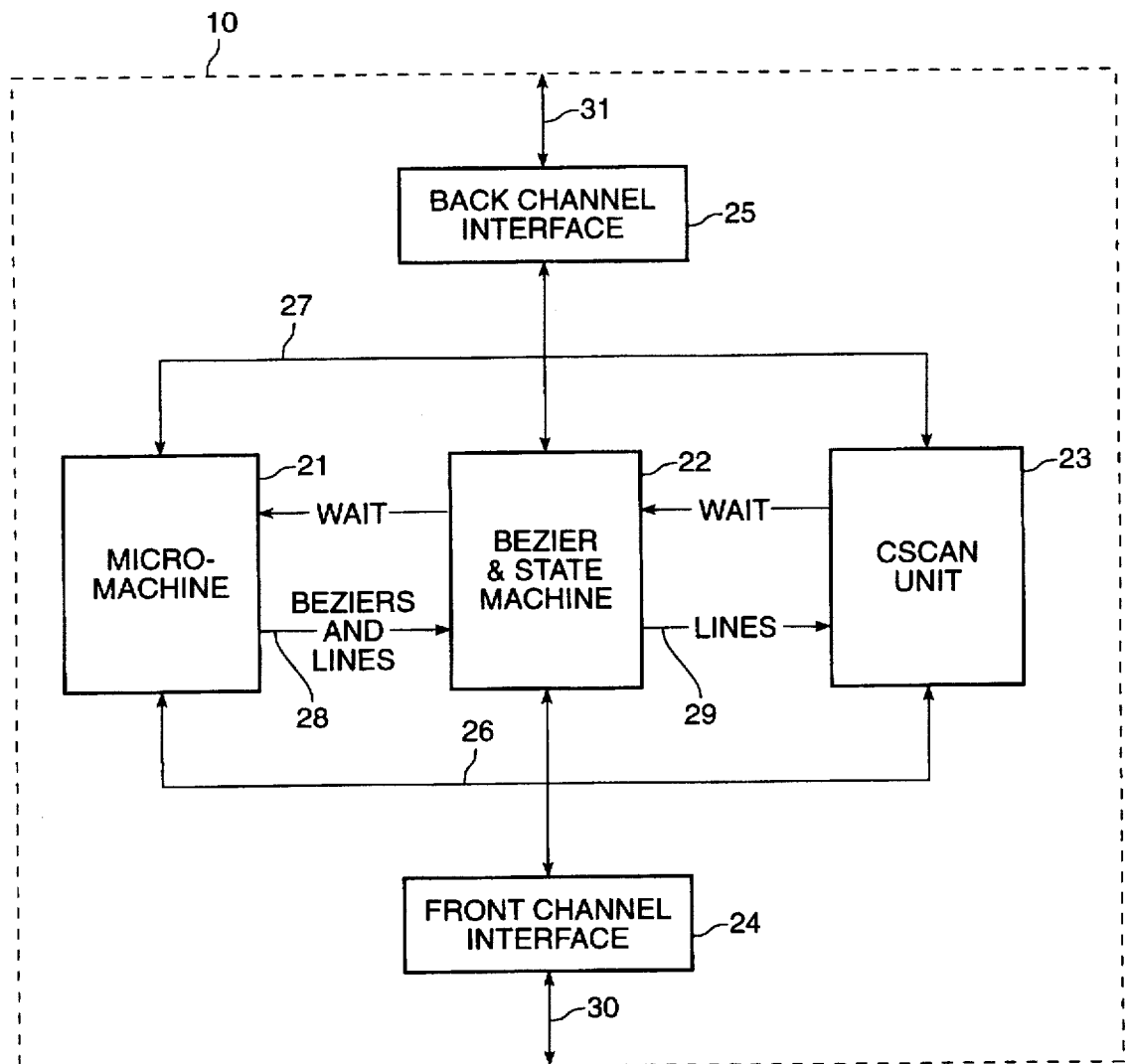
FIG. 2 illustrates the major functional blocks of the co-processor of the invention.

Referring to FIG. 2, the main elements of co-processor 10 are micromachine 21, Bezier and stack machine 22 and Cscan unit 23, each of which are connected via front channel bus 26 to each other and to front channel interface 24, which in turn is connected to main bus 16 (shown in FIG. 1) via line 30. Each of units 21, 22 and 23 also are connected via back channel bus 27 to each other and to back channel interface 25, which in turn is connected to optional private memory 11 (shown in FIG. 1) via line 31. Micromachine 21 and Bezier and stack machine 22 are connected together through pipeline 28. Similarly, Bezier and stack machine 22 and Cscan unit 23 are connected together through pipeline 29. The operation of each unit and the information passed along each pipeline are described in detail below. Each of the buses and channels in FIG. 2 can be modified under program control so that if one bus fails or does not function properly, co-processor 10 can be reconfigured to use alternative interconnections between the units.

The primary function of co-processor 10 is to intelligently render Type 1 font programs into device specific raster bit maps. The process of rendering a Type 1 font program can be broken into three main areas: 1) "hinted" transformation of Bezier control points; 2) linearization of a character outline; and 3) intelligent filling of an outline. These steps are implemented by micromachine 21, Bezier and stack machine 22 and CScan unit 23.

Micromachine 21

Micromachine 21 implements the first step of interpreting the hints in a Type 1 font program and applying those hints to convert a Type 1 font program into a stream of intelligently transformed Bezier control points. Hints, described in more detail below, are essentially directions from the type designer encoded with a font or character that suggest, for example: keeping certain features of equal or similar widths; setting x-heights to fall within a certain range at large point sizes and within a more limited range at smaller point sizes; and other factors or parameters that aid in maintaining the general characteristics of a font over a wide range of scaled sizes.

Figure 3:
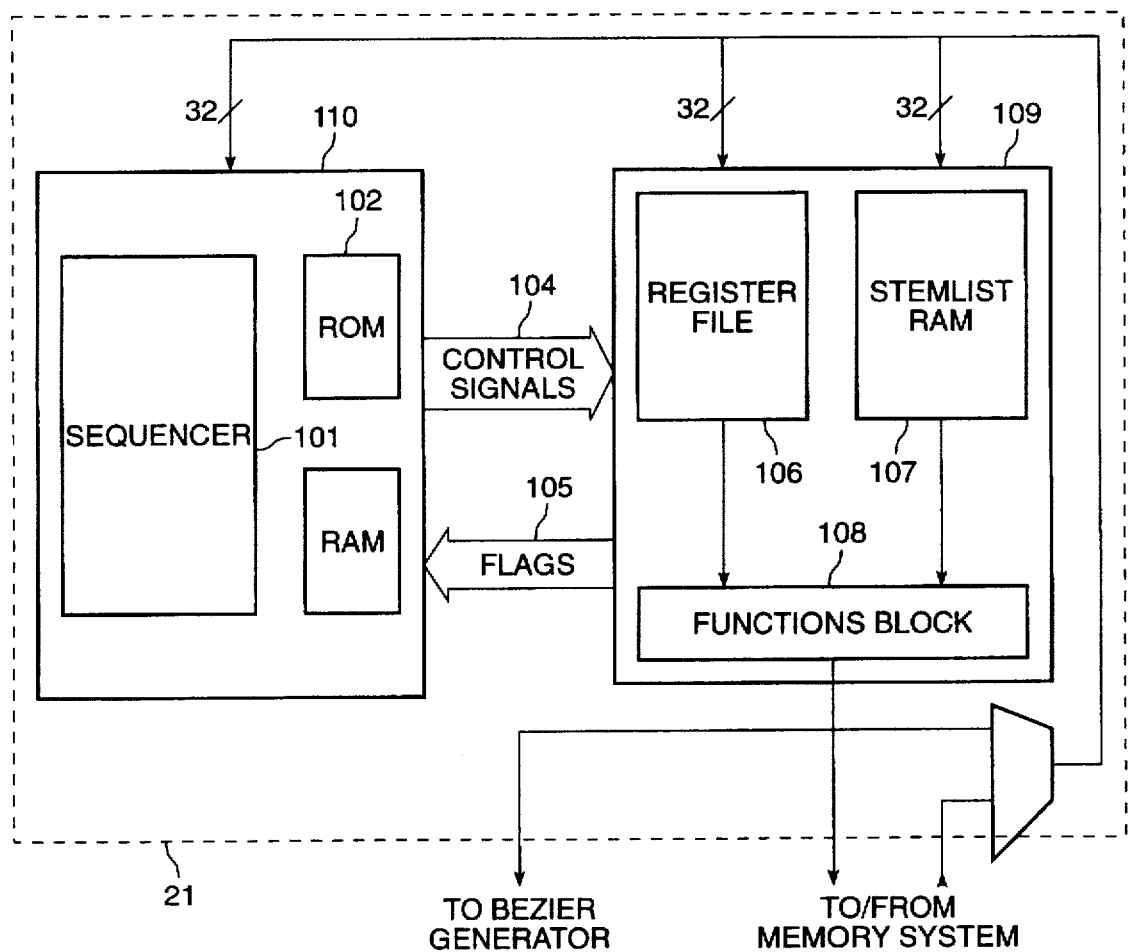
FIG. 3 illustrates the major functional blocks of the micromachine.

Referring to FIG. 3, the main components of micromachine 21, subsystem 110 and datapath 109, are shown. Subsystem 110 is a collection of logic circuits which implement the first stage of hinting of the Type 1 font program. Subsystem 110 includes sequencer 101 which controls and coordinates the operations of subsystem 110. The major blocks of subsystem 110 are generally known and understood in the industry. Sequencer 101 performs the functions of a generic microprocessor, including branching, branching to subroutines and branching on condition. The instructions for sequencer 101 are contained in ROM 102, holding, for example, 896 words in the preferred implementation where a microinstruction word is 58 bits wide. Subsystem 110 includes RAM 103 holding, for example, 128 words of microinstruction RAM, loadable under the control of a ROM-resident program. Having RAM 103 on board and connected to sequencer 101 allows sequencer 101 to execute software that does not have to be resident in co-processor 10 unless and until required. The complexity of the Type 1 programming language and its continuing evolution favor incorporating this form of flexibility.

Sequencer 101 controls a series of logic elements and storage areas in datapath 109 by exchanging control signals and flags over buses 104 and 105, respectively. Datapath 109 includes register file 106, StemList RAM 107 and functions block 108. Functions block 108 includes: logical functions; one or more adder/subtractors; status flags; a 24×24 bit multiplier and a fixed point divider. Functions block 108 carries out renderer-specific operations, such as stem search operations such as Width and Center, functions that have been specifically implemented in the FRC to accelerate the rendering process.

To generate a bit map at a specific size, an outline must generally be scaled to the correct size when displayed on the marking engine. In addition, it is helpful to identify certain features and align similar features on pixel boundaries with balanced feature dimensions. The method to distort outlines should be simple and fast, preferably implemented both in software and hardware.

Figure 5:
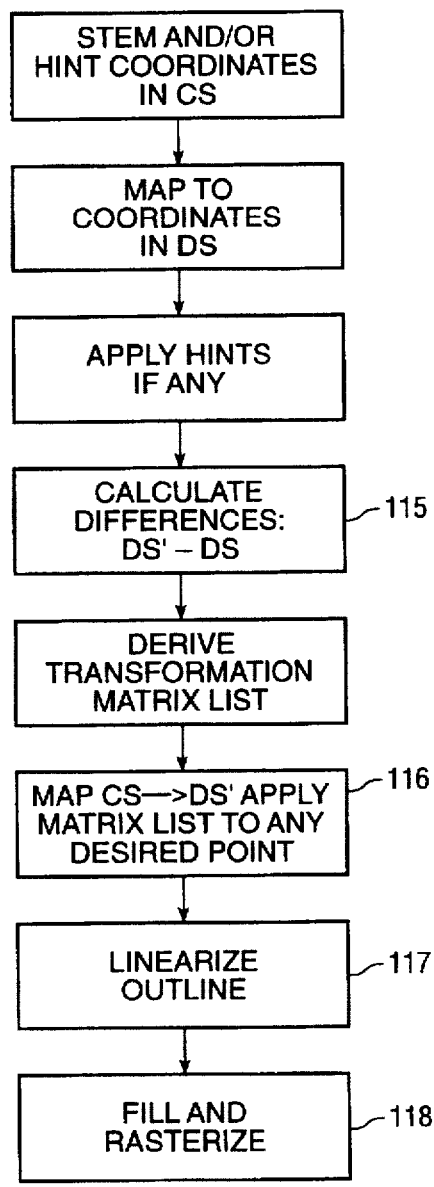
FIG. 5 illustrates a flow chart showing the major steps of the current method.

Referring to FIG. 5, the general steps of transforming and adjusting an outline are to first map at least some points to coordinates in device space, identify any adjustments that need to be made, e.g. to keep stem widths similar in size or to keep features aligned on pixel boundaries, then derive a transformation matrix which will achieve the needed distortions. The transformation matrix can then be applied to key points in the character outline data to convert the outline into device space. Prior art methods require two steps to achieve the transformation while the current method saves a step. The scaled and adjusted outline is then linearized, step 117, filled and rasterized, step 118, and prepared for display on a raster device or printer. The current method calculates and uses differences in device space, step 115, and then transforms original outline data to hinted device space, step 116, neither of which has been done before.

Transforming Outline Data—Background

Referring to FIGS. 4a, 4b, 6a, 6b and 7, the shape of a character can be modified in one or more particular axes, for example, the X axis. It is desirable to align certain features with pixel boundaries in display space and to give features dimensions that include full pixels, when possible.

Figure 6A:
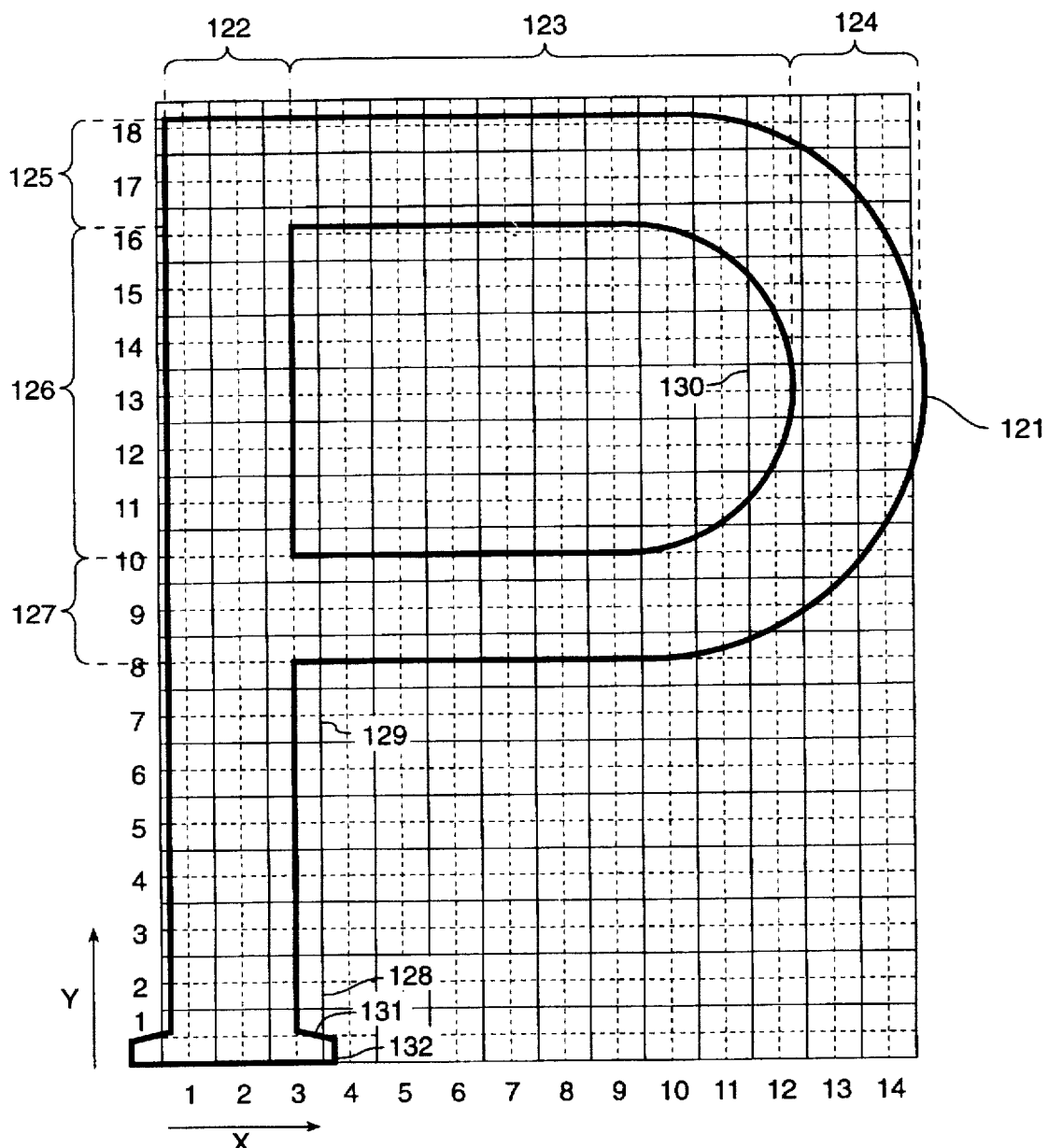
FIGS. 6a, 6b and 7 illustrate mapping a character into device space and hinted device space.
Figure 6B:
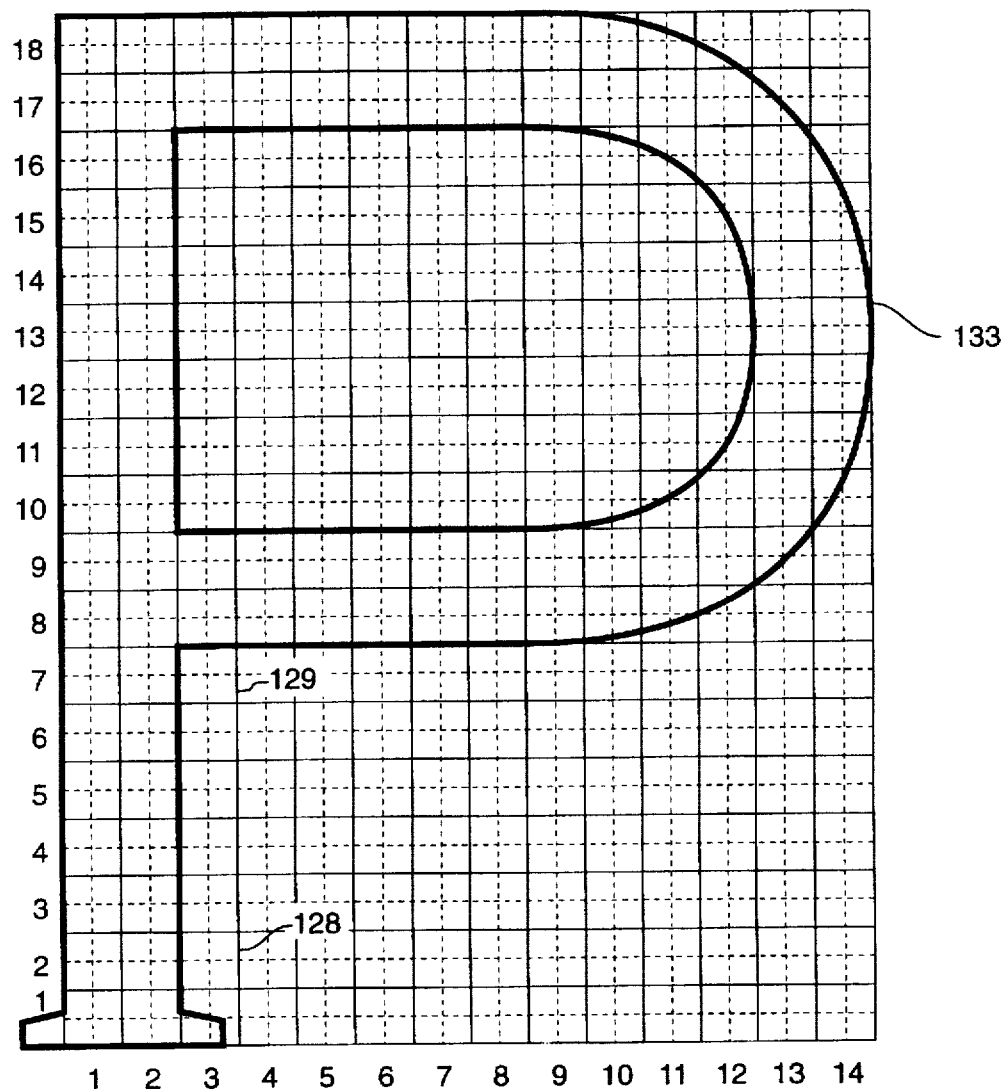
Figure 7:
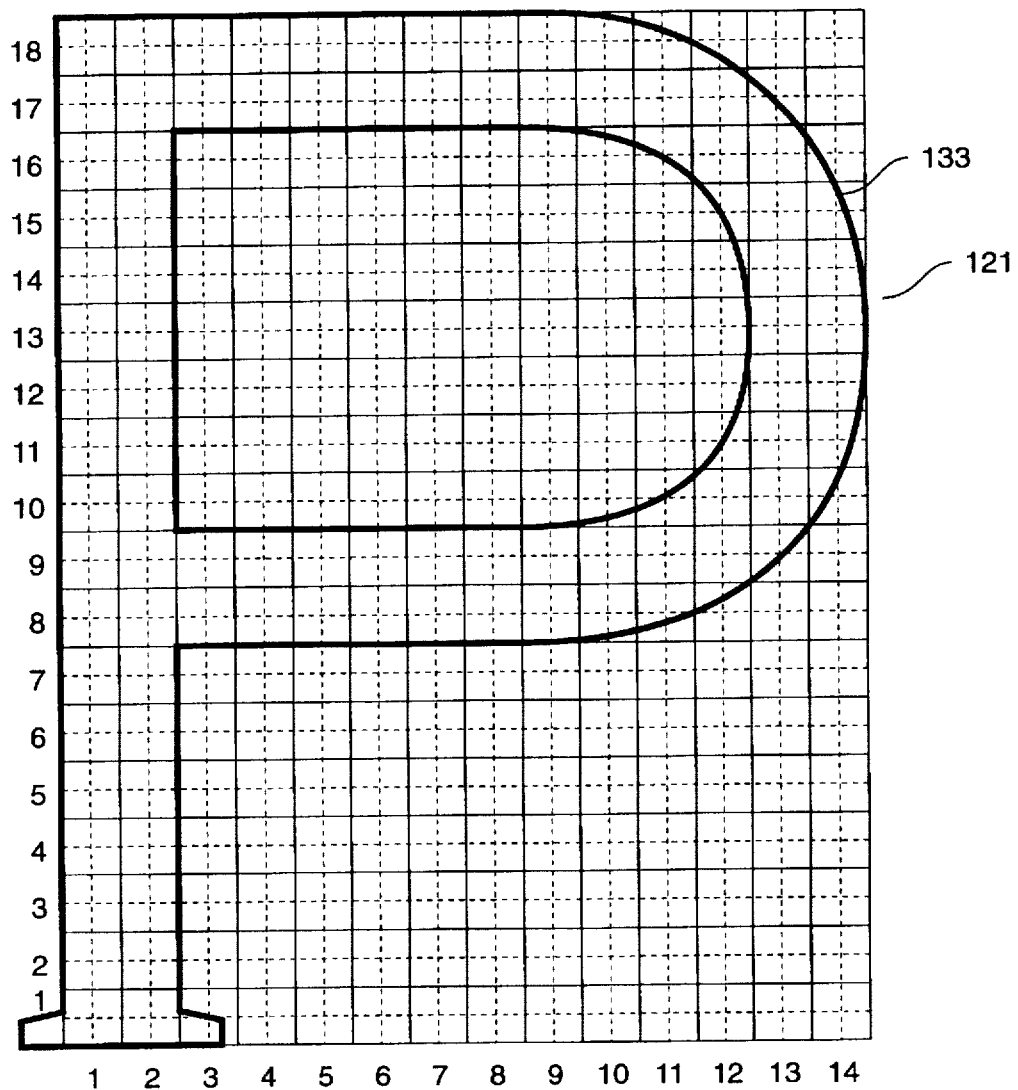

Referring to FIG. 6a, outline 121 shows a direct transformation of outline data from character space to device space using only scaling. To display this particular outline at the scaled point size requires making many choices well known to one skilled in the art, for example whether or not to display pixels 128 through 129, at (x,y) coordinates (3,1) through (3,7), or pixel 130, at (12,13). Outline 121 includes a serif feature including line segments 131 and 132 and this feature may not be displayable below a certain point size or resolution. Referring to FIGS. 6B and 7, outline 121 has been distorted in hinted device space to outline 133, generally maintaining the dimensions of the original outline but using whole pixels when possible. FIG. 7 is a compound drawing showing how outline 133 is much easier to display on the pixel grid than is outline 121.

A typical character includes one or more regions, such as vertical or horizontal stems, that should be balanced in any rendered bit map, both within a character and between characters in a font. Examples of vertical stems are the uprights in an "H", "B" or "P", e.g. stem 122 in FIG. 6a, as well as the vertical extreme of a bowl of a "B" or "P", e.g.

stem 124 in FIG. 6a. Note that a "B" has two bowls and thus may have two or three vertical stems. Referring to FIG. 6a, stems 125 and 127 are horizontal stems. It is generally desireable to balance both vertical and horizontal stems. A lower case "o" in one type face may be even and circular and may call for equal horizontal and vertical stems while another "o" may narrow at the top and bottom and may call for equal horizontal stems with a different dimension from equal vertical stems. Type designers and users also make use of counters, which are generally specific spaces which affect the shape or design of a character. Vertical counter 123 and horizontal counter 126 are two examples.

Figure 4A:
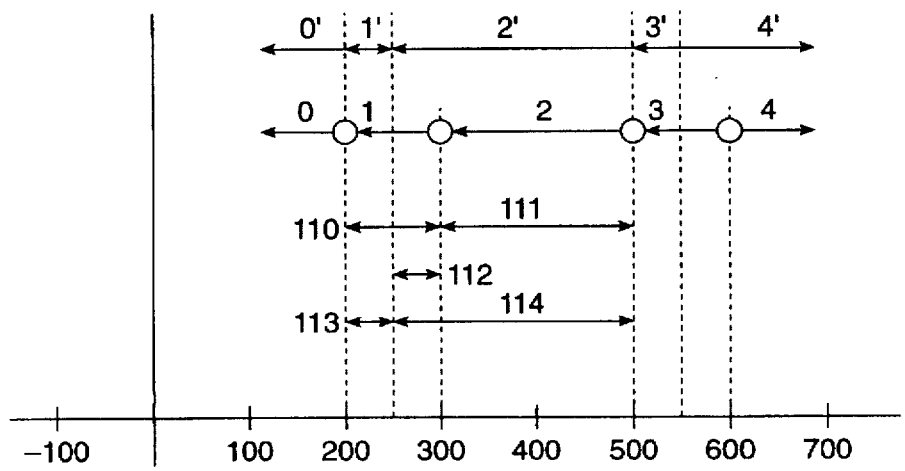
FIGS. 4a and 4b illustrate transformation and mapping of coordinates.

A character can be divided into zones, each of which may include a vertical stem or a space between or outside stems. Distorting each zone by compression or expansion allows scaling the character while retaining balance between various zones to produce a satisfactory rendering of the character. A typical scaling process may include both compression and expansion of zones. For example, if an important zone when scaled is less than a pixel wide, it might be expanded to be one pixel wide (along with corresponding zones of equal significance) and the intervening zones might be compressed to balance the rendering. Referring to FIG. 4a, zones 1 and 3 represent important features, such as the uprights of an "H" or the upright and bowl of a "P"), whereas zones 0, 2, and 4 are essentially background and will be distorted as a result of any manipulations performed on zones 1 and 3. Thus zones 1 and 3 can be considered distortion zones and zones 0, 2 and 4 can be considered compensation zones. Choosing which distortions to apply is based on type design considerations and display characteristics such as display resolution and character size. Methods of specifying distortions are known to those skilled in the art. One method of specification is hinting, used in the Type 1 font description and described in detail below.

Deriving the Transformation Matrix

Since the character outline will be transformed from character space to device space to produce the device specific rendering, it seems logical to use the same transformation to achieve any required distortion. A desired series of distortions is implemented through a transformation matrix. Transformation matrix operations can be separated into zonal areas using a list of matrices, one for each zone. Together, these matrices represent a piecewise transformation matrix for converting coordinates in character space to coordinates in device space. Referring to FIG. 4a, zones 0, 1, 2, 3 and 4 correspond to matrices M0, M1, M2, M3, and M4 (the matrices are not shown) and modified zones 0', 1', 2', 3' and 4' correspond to matrices M0', M1', M2', M3', and M4'. Zones 0 and 4 extend to the end of the space defined f or the character. For all points between a zone's edges, the corresponding matrix is applied to transform points in character space to device space. Points that share edges with two zones can be assigned randomly to one zone or the other or can be assigned to a zone by a rule, for example, always use the zone to the left.

The transformation matrix for each zone is identical in the simple case of no distortion. By way of example, zones 1 and 3 are distorted by compressing them by 50% through a simple, linear transformation, the new matrices for these zones would be:

$$M1' = M1 * 0.5$$

$$M3' = M3 * 0.5$$

where

MZ is the matrix for points in zone Z in a first coordinate space and

MZ' is the matrix for points in zone Z in a second coordinate space.

Referring to FIGS. 4a and 6a, zone 1 of FIG. 4a corresponds to stem 122, the upright stem of the "P", zone 2 of FIG. 4a corresponds to counter 123, zone 3 corresponds to stem 124, the bowl of the "P", and zones 0 and 4 correspond to the left and right bearings, respectively, that separate the "P", from adjacent characters. The values in FIG. 4a are selected for illustration and for ease of calculation and do not correspond exactly to the dimensions of FIG. 6a.

Optimal rasterization often requires not only scaling, but also alignment of zones to pixel columns in device space, for example, to fall on pixel boundaries. For example, zones 1 and 3 can be compressed by 50% solely by moving the rightmost edge. This is equivalent to shrinking the width of each stroke in a character, effectively making a thinner character, known to typographers as a lighter weight. This type of compression is often necessary simply to set major stroke widths equal to an integral number of pixels. Compare FIG. 6a, with unadjusted stroke widths of approximately 2.4 pixels, to FIG. 6b, with stroke widths compressed to two pixels. Referring to FIG. 4a:

|  | original | modified |
|---|---|---|
|  | zone 1 |  |
| $CS_n$ | 200 | $CS_n'$ 200 (not moved) |
| $CS_{n+1}$ | 300 | $CS_{n+1}'$ 250 (width has been compressed by 50%) | where:

n: edge "n", left edge of zone n+1: right edge of zone $CS_n$: Character space edge "n" (unadjusted)

$CS_n'$: Adjusted (hinted) character space edge "n"

The left edge $CS_n'$ of zone 2 shifts with the right edge $CS_{n+1}'$ of zone 1 as zone 1 is compressed, expanding zone 2 by 50 units, but the right edge of zone 2 stays fixed, for an adjusted width of 250 units.

|  | zone 2 |  |
|---|---|---|
| $CS_n$ | 300 | $CS_n'$ 250 (shares edge with zone 1) |
| $CS_{n+1}$ | 500 | $CS_{n+1}'$ 500 (shares edgewith zone 3) |

If points in device space need to be adjusted to meet typographic design criteria, the complete transformation matrix generally will be non-linear. Here, zone 2 becomes larger by 25% while zone 1 becomes smaller by 50%, so the zones must use different matrices.

The compensation factor ($C_f$) provides the scaling factor needed to distort a zone. $C_f$ is simply the ratio of the adjusted width of a zone divided by the original width of zone. The ratio of the compensation factor is shown below:

$$C_f = \frac{\text{modified width}}{\text{unmodified width}} = \frac{\text{deltaCS} + (CS_{n+1} - CS_n)}{(CS_{n+1} - CS_n)}$$

For example, for zone 2:

$$C_f[2] = \frac{(300 - 250) + (500 - 300)}{(500 - 300)} = 1.25$$

Prior art methods of implementing zonal transformations may generate discontinuities as an abrupt change in transformation matrix values transitioning from zone to zone, for example, in going from zone 1 to zone 2. Simply setting $C_f=1.25$ and scaling up zone 2 by 25% would transform the left edge of zone 2 to 250*1.25=312.5; and would transform the right edge of zone 2 to 500*1.25=625. These are not the desired values. These discontinuities may produce a noticeable effect at each edge. To eliminate these discontinuities, the transformation matrix can be modified to include a translation factor:

$$x'[Z]=(x-CS_n)*C_f+CS_n' \qquad \text{Eqn. 1}$$

where:

x=point x in zone Z $(x-CS_n)$=Normalizes original point x in current zone Z as a "width"

$C_f$=Compensation Factor, amount zone is distorted $CS_n'$=Translation factor, restoration to new coordinate space For zone 2, this becomes:

$$x'[2]=(x-300)*C_f+250$$

The transformation of the right edge of zone 2 becomes (500-300)*1.25+250=500, precisely the value desired.

This process is repeated in a similar manner, calculating $C_f$ and offset translation for each zone, to yield a piecewise, generally non-linear transformation matrix, $[S_x,S_y]$.

The above example shows the conversion of the original coordinate data in character space (CS) to a new coordinate space called hinted character space (CS'). In the prior art ATM method, these distortions were first made in device space (the actual target of all character modifications) then backed into character space through an inverse transformation matrix (that is, a transformation matrix that "undoes" the device space transformation matrix) to create the CS' coordinate data. Converting the CS' data points to hinted device space (DS') requires applying the final transformation matrix $[S_x, S_y]$ to the original coordinate data $[Cx_n, Cy_n]$ in CS.

$$\text{CS} \quad [Cx_0, Cy_0] \rightarrow \text{CS'} \qquad \text{CS'} \quad [S_x, S_y] \rightarrow \text{DS'}$$
$$[Cx_1, Cy_1]$$
$$***$$
$$[Cx_n, Cy_n]$$

The DS' data points then can be filled using prior art methods or the methods described below. The filled outline can be stored or displayed directly.

The Current Method

The present invention combines compensation transformation and device space transformation to allow higher throughput and streamlined operation. This method distorts an object outline by creating a series of transformation matrices applied on a zonal basis. This method is sometimes referred to as a piecewise-nonlinear transformation using a transformation matrix list to emulate the operation of a nonlinear transformation function.

Transforming Outline Data and Deriving the Transformation Matrix

The FRC implements zonal distortions in a slightly different yet mathematically identical manner. In contrast to the above example, the FRC does not track either the final width of a zone, e.g. 113 for zone 1 and 114 for zone 2 in FIG. 4a, or a zone's new right edge (300–>250 for zone 1), but tracks the delta of change (112 or −50 units for both zones 1 and 2). Making a zone smaller is treated as a negative value. This change makes the calculation of the $C_f$ simpler:

$$C_f = \frac{\text{delta}}{\text{original width}}$$
$$= -50/100 = -0.5 \text{ for zone 1}$$
$$= +50/200 = 0.25 \text{ for zone 2}$$

The equation for transformation becomes:

$$x'_{CS}[Z] = (x - CS_n) * (1.0 + C_f) + CS_n$$

$$x'_{DS}[Z] = S_f * (x - CS_n) * (1.0 + C_f) + CS_n' * S_f$$
$$= (x - CS_n) * (S_f + C_f) + DS_n'$$

For zone 2:

$$x'_{CS}[2]=(x-300)*(1.0+C_f)+250$$

$$x'_{DS}[2]=(x-300)*(S_f+C'_f)+DS'_n$$

The equation includes a new factor, $S_f$ or scale factor for the f dimension (x or y). These equations can be simplified.

The distorted width of the zone in device space (the DS' width) can be divided by the unhinted character space width (CS width) to produce the combined device space transformation/compensation factor value. The equation to fully transform a coordinate becomes:

$$C_{fc} = \frac{(DS'_{n+1} - DS'_n)}{(CS_{n+1} - CS_n)}$$

which can be restated as:

$$C_{fc} = S_f + \frac{(\text{delta}DS_{n+1} - \text{delta}DS_n)}{(CS_{n+1} - CS_n)}$$
$$= S_f + C_f$$

$$x'_{CS}[Z] = (x_{CS} - CS_n) * C_f + CS_n$$

$$x'_{DS}[Z] = x'_{CS} * S_f$$
$$= (x_{CS} - CS_n) * C_f * S_f + CS_n' * S_f$$
$$= (x_{CS} - CS_n) * C_{fc} + DS_n'$$

Simplified:

$$x'_{DS}[Z]=x_{CS}*C_{fc}+(DS'_n-CS_n*C_{fc}) \qquad \text{Eqn. 3}$$

The constant term is set equal to K:

$$K=DS'_n-CS_n*C_{fc} \qquad \text{Eqn. 4}$$

where:

$C_{fc}$: Composite compensation factor $S_f$: Scale factor, e.g. $S_x$ in the x dimension $C'_f$: $C_{fc}-S_f$ Since only one level of transformation operation is required, the number of multiplications performed by the renderer has been decreased.

This method can be implemented using the following pseudocode.

PseudoProcedure CreateMap #Repeat for each axis, typically x and y

```
n = 1                    # initialize index
K[0] = deltaDS'[0]       #Offset factor
Cfc[0] = Sf              #Compound compensation factor
for n ≦ NumberOfEdges
    #Calculate Transformation Mapping Cfc[n] = Sf + (deltaDS'[n+1] - deltaDS'[n])
                  ─────────────────────────────
                       (CS[n+1] - CS[n])

K[n] = DS'[n] - Cfc[n] * CS[n]
next n
K[n] = deltaDS'[n]
Cfc[n] = Sf
```

Applying the Transformation to the Outline Data

The compensation matrices and the device space matrices can be combined and applied to the original outline data to derive the desired final transformation in a single step. Prior art distortions transform characters from CS to CS', hinted character space, and subsequently into hinted device space DS'. Many mathematical steps (and significant time) can be avoided if hinting stays in device space. The present invention bypasses the CS' coordinate system to simplify operations. The new compensation factors include the actual device space transformation in addition to the distortion factors.

```
CS [Cx₀,Cy₀] -> DS'
   [Cx₁,Cy₁]
   * * *
   [Cxₙ,Cyₙ]
```

The DS' data points then can be filled using prior art methods or the methods described below. The filled outline can be stored or displayed directly.

Hinting

The rasterization process can be deliberately distorted to improve the appearance and/or legibility of characters being generated. Specific information can be included in the font data to direct or guide a renderer to make adjustments and corrections in the scaling and rasterization of the final bit map and produce a more optimal result. One such process is referred to as hinting and the data generally included in the font outline is referred to as hints. Hints are typically applied in device space but can also be applied in character space before scaling the outline data.

The process of hinting involves identifying certain common characteristics of classes of objects and defining a series of processes to maintain the aesthetic nature (and, in the case of fonts, legibility) of the object being rendered, even at extremely large or small sizes. Basic hinting methods and applications are described at length along with the Type 1 font encoding specification in ADOBE TYPE 1 FONT FORMAT (the "Black Book", 1990), incorporated herein by reference. The FRC implements these operations in a novel manner.

Hinting commands include stem hinting commands hstem, vstem, hstem3 and vstem3. In accordance with the distortion methods described earlier, a stem is analogous to a distortion zone. The areas between stems, called counters in typographical terms, become the compensation zones. The program designer or type designer can choose certain rules to control the placement of the edges of a stem for optimal rendering and the width of the stem for consistent stroke color. These methods result in distortions that are then used to create the distortion matrix list. The Type 1 font specification includes additional zones specified by the BlueValues[] and OtherBlues[] arrays, which allow coordination with the placement of the stem zones to ensure proper character height rendering at small sizes, as discussed below. The term height includes both ascenders above the X-height and other typographic top zones, as well as descenders below the baseline and other typographic bottom zones. The following methods are used to control the width and edge placement of stems. The examples are in terms of X-coordinates and widths, but corresponding adjustments in Y-coordinates and height are made in an analogous manner.

Width

Figure 4B:
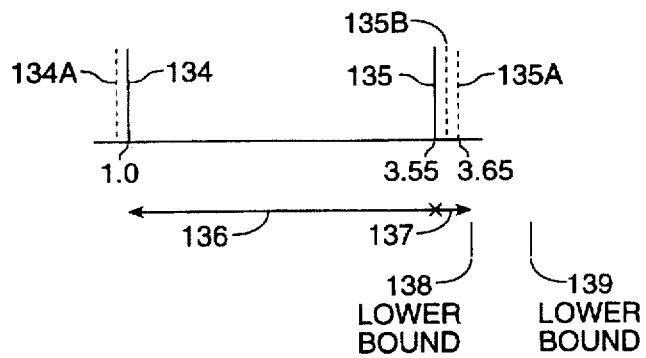

The width of the stem in character space is represented by $Width_{CS}$. The width after transformation to device space is represented by $Width_{DS}$, generally with a fractional value. $Width_{DS}$ can be represented as i.ff, where i represents the integer portion of the width and .ff represents the fractional portion. Subsequent processing is made easier if there are a minimal number of points exactly on certain thresholds, such as coincident with a pixel center. The width can be adjusted around selected threshold points, where the threshold points are set by design to achieve visually acceptable, or, better yet, optimal, renderings. For example, the values of the width can be restricted to a specified range determined by a lower boundary (0.625) and an upper boundary (0.900). FIG. 4b illustrates one width evaluation and shows adjustment of width 136 by $delta_{width}$ 137 to bring the width of the stems into the range between LowerBound 138 and UpperBound 139. One can use the following rules for adjusting the width by $delta_{width}$ to keep all widths between the specified boundaries:

(1) if (0.625<.ff≦0.900)
    $delta_{width}$=0.0
(2) if (0.5≦.ff≦0.625)
    $delta_{width}$=0.625−0.ff
(3) if (.ff>0.900)
    $delta_{width}$=0.900−0.ff
(4) if (.ff<0.5)
    $delta_{width}$=(0.900−1)−0.ff These examples illustrate the four width adjustment rules:

| | | |
|---|---|---|
| 10.75 -> 10.75, | $delta_{width}$ = 0.0 | (rule 1) |
| 9.55 -> 9.625, | $delta_{width}$ = +0.075 | (rule 2) |
| 4.97 -> 4.900, | $delta_{width}$ = −0.07 | (rule 3) |
| 9.45 -> 8.9, | $delta_{width}$ = −0.55 | (rule 4) |

This adjustment to the $Width_{DS}$ can be turned into movement of edges by apportioning the total $delta_{width}$ between each edge. Add ½ of the $delta_{width}$ to the greater edge (rightmost edge, often referred to as the next or to edge) and subtract ½ the $delta_{width}$ from the lower edge (the leftmost edge, often referred to as the first or from edge). A negative $delta_{width}$ value means the stem becomes thinner and thus the left edge must be moved to the right (made larger numerically) and the right edge must be moved left (made smaller). Referring to FIG. 4b, the stem between left edge 134 and right edge 135 has a width 136 of 2.55. This width value does not have a fractional part between LowerBound 138 and UpperBound 139 and so must be adjusted. Applying rule 2, width 136 is adjusted to 2.625, equivalent to moving right edge 135 to position 135A, giving $delta_{width}$ 137= 0.075. $Delta_{width}$ is apportioned between the edges by subtracting 0.075/2 from left edge 134, moving it to position 134A, and adding 0.075/2 to right edge 135, moving it to position 135B.

Centering

It is important to represent features by whole pixels whenever possible and to select, where possible, where the edges of a stem fall. For small features, or for characters at small point sizes, positioning the center of the stem can control the location of the edges. The rule is very simple: 1) if the rounded width of the stem is even, move the center to the pixel boundary closest to it; and 2) if the rounded width of the stem is odd, move the center to the nearest ½ pixel boundary. In general, width hinting is performed before centering. Below are a few examples of centering.

$Width_{DS}$=5.73, Center=4.3
(EVEN) Center->4.0 ($delta_{center}$=-0.3)

$Width_{DS}$=8.90, Center=11.6
(ODD) Center->11.5 ($delta_{center}$=-0.1)

$Width_{DS}$=3.8, Center=7.65
(EVEN) Center->8.0 ($delta_{center}$=+0.35)

$Width_{DS}$=6.6875, Center=9.3
(ODD) Center->9.5 ($delta_{center}$=+0.2)

The $delta_{center}$ value is applied to both edges equally, in essence shifting both edges in the same direction to align both of them.

One method of evaluating the delta terms is provided in the following pseudocode:

PseudoProcedure SetDelta
  For n=1 to NMax
    DSn=CSn*Sf #scale edges
    DSn+1=CSn+1*Sf
    Adjust widths:
    StemWidth=DSn+1-DSn
    HintedStemWidth=round(StemWidth)
      # Alternatively, hintedStemWidth can be selectively defined for a stem
    if HintedStemWidth is even, CenterOffset=0,
    else CenterOffset=0.5
    fError_w=HintedStemWidth-StemWidth
    Adjust centers:
    StemCenter=(DSn+1+DSn)/2
    HintedStemCenter=round(StemCenter)+CenterOffset
    fError_c=HintedStemCenter-StemCenter
    DS'n=DSn-fError_w/2+fError_c/2
    DS'n+1=DSn+1+fError_w/2+fError_c/2

After performing both the Width and Centering adjustments, the stem has been fully hinted. A set of adjustment errors is associated with each edge of each hinted stem. These adjustment errors must now be changed into the transformation matrix list that is used to distort the outline data.

Referring to FIG. 4a, assume that zones 1 and 3 are stem areas to be adjusted to dimensions 1' and 3'. The zones are specified by the following vstem commands in standard Type 1 font format:

| 200 100 vstem 500 100 vstem | (a vstem beginning at unit 200, delta 100 units to the next edge, then a vstem beginning at unit 500, with delta of 100 units). |
|---|---|

The device space transformation shall be, for example, a scale factor of 0.08333, which corresponds to a 10 point character on a 600 dpi raster device. The edge pairs become:

| CS | DS | $Width_{DS}$ |
|---|---|---|
| [200, 300] | [16.667, 25.0] | [8.333] |

-continued

| CS | DS | $Width_{DS}$ |
|---|---|---|
| [500, 600] | [41.667, 50.0] | [8.333] |

The first step is to adjust the width of each stem. Since the value 8.333 is covered by width adjacent rule 4, above:

8.333->7.900 ($delta_{width}$=-0.433)

the $delta_{width}$ is apportioned to the stem edges as follows:

Zone 1
16.667-(-0.433/2)=16.667+0.217=16.883
25.0+(-0.433/2)=24.999-0.217=24.783

Zone 3
41.667-(-0.433/2)=41.667+0.217=41.883
50.0+(-0.433/2)=50.0-0.217=49.783

The width of 7.900 rounds up to 8.0, an even number. The current center of the stems are 20.833 for zone 1 and 45.833 for zone 3. Stems with an even width are moved to the nearest pixel boundary, thus:

20.833->21.0 ($delta_{center}$=+0.167)
45.833->46.0 ($delta_{center}$=+0.167)

Since repositioning the center is accomplished by shifting both edges by the same amount, add the $delta_{center}$ value to both edges of the zone:

Zone 1
16.883++0.167=17.050
24.783++0.167=24.95

Zone 3
41.883++0.167=42.050
49.783++0.167=49.950

This completes hinting the stem. The final locations of the stem edges are the DS' coordinates. These coordinates are the final hinted position of the stem. To create the transformation matrices that will distort the outline data, such that the character space coordinates will map to the new hinted device space coordinate plan, all the manipulated edges and the amount of distortion incurred in the hinting are listed.

For Scale factor=0.0833

| Zone | CS | DS | DS' | net $delta_{hints}$ |
|---|---|---|---|---|
| 1 | 200 | 16.667 | 17.050 | +0.383 |
| 2 | 300 | 25.0 | 24.950 | -0.050 |
| 3 | 500 | 41.667 | 42.050 | +0.383 |
| 4 | 600 | 50.0 | 49.950 | -0.050 |

This gives 4 edges (200, 300, 500, 600) and 5 zones (<200, 200->300, 300->500, 500->600, >600). The equations follow the format, equivalent to substituting Equation 4 into Equation 3:

$$x'[Z]=C_{fc}*x+K$$

to construct matrix lists:

zone 0 (x<200)
  $C_{fc}=S_x=0.0833$
  K=deltaDS'[0]=0 zone 1 (200<x<300)

$$C_{fc} = \frac{(24.950 - 17.050)}{(300 - 200)} = 0.078125$$

$$K = 17.050 - 0.078125 * 200 = 1.250$$

zone 2 (300<x<500)

$$C_{fc} = \frac{(42.05 - 24.950)}{(500 - 300)} = 0.0855$$

$K = 24.950 - 0.0855 * 300 = -0.700$ zone 3 (500<x<600)

$$C_{fc} = \frac{(49.95 - 42.05)}{(600 - 500)} = 0.07900$$

$K = 42.05 - 0.07900 * 500 = 2.550$ zone 4 (600<x)
$C_{fc} = 0.0833$
$K = deltaDS'[4] = -0.0500$ Note that the boundary zones 0 and 4 are calculated differently. Since there are no adjustments to these regions the scale factor should be unchanged. However it may be necessary to compensate for any shift in an edge shared with an adjacent zone. This is accomplished by introducing a shift equal to the difference between the DS edge position and the DS' edge position.

FRC Hinting

The basic mechanisms for interpreting hints and generating the matrices list explained above are implemented in the FRC using the specialized hardware elements. These allow the FRC to vastly outperform software or general purpose processing devices. The following commands use and return the following parameters:

WIDTH fWidth$_{DS}$, lowerBnd, upperBnd, fError$_w$

The WIDTH command implements the stem width adjustment necessary for the first step of hinting a stem. The variable fWidth$_{DS}$ contains the unhinted device space width of the stem. The lowerBnd and upperEnd are the threshold constants (in the above example, 0.625 and 0.900, respectively). fError$_w$ is provided to hold the deviation result of the WIDTH command.

CENTER fWidth$_{DS}$, fCenter$_{DS}$, fError$_c$

The CENTER command implements the centering operation performed in the second step of hinting a stem. The fWidth$_{DS}$ variable provides the hinted width of the stem in device space so that the even/oddness of the stem can be determined. The variable fCenter$_{DS}$ is the unhinted, device space center of the stem. fError$_c$ will hold the adjustment that is to be made to the center point for proper edge positioning.

More Hinting

The description to this point covers a method for distorting contour data points using a transformation matrix list, and using this method for stem hinting. Almost any distortion to the contour data is possible using transformation lists. The methods outlined above show how the sub-pixel manipulations of stem hinting can be transformed into a list of transformation matrices which produce the desired hinting results. Essentially any desired manipulation of the device space coordinate data can be effected through the use of matrices lists.

Character hinting can be used not only to fix stems but also for positioning stems to control the white space or gaps between stems (known as counters) or to adjust the height and/or width of the character body to conform with the rendering of other characters in the font at a particular size or range of sizes. Device space manipulation after the stem hinting operation can be used to achieve these goals. Two major hinting schemes useful in achieving these goals use BlueValues and FamilyBlues, as described in sections 5.2 and 5.5 et seq. of the BLACK BOOK.

Height Control

Subtleties of font details may not be displayable below certain point sizes. At such sizes it may be necessary to homogenize specific features of a font. Heights of characters (such as the height of an 'e' and 'o') may be slightly different in a full sized character yet indistinguishable at small sizes so the heights of such characters can be constrained at smaller sizes. The BlueValue[] and OtherBlues[] arrays in the Type 1 font dictionary provide information for detecting when these operations may be required and what height the characters should conform to. When appropriate, stem edges are adjusted via delta$_{height}$ (analogous to delta$_{width}$, described above) in creating the transformation matrices. Height control is performed before stem hinting to enable comparison of unhinted device space heights.

Counter Control

At times it is necessary not only to control the size of stems, but also the spacing between stems (the counters). Both the prior art method and the current method use two types of correction to control counters: stem spacing and global coloring.

Stem spacing uses the vstem3 and hstem3 commands to adjust characters with three stem counters (such as vstems in a lower-case m). First the stems are hinted in the normal manner, then each counter is compared with its pre-hinted width. The counter closest to the "ideal" width becomes the control counter and the stems bounding the control counter are not changed. The other counter is modified by moving both edges of remaining stem, which is the outermost stem adjacent to the counter to be modified. Moving both edges of the outermost stem maintains the hinted stem width.

Global coloring provides a more exhaustive method of stem and counter control. To facilitate the recognition of counters (and to prioritize their importance), special data which specifies stem paths is included in a Type 1 font program. A stem path is a sequence of stems from which the counters between the stems are to be controlled. A character can have many stem paths, and each stem path can have many stems. The presentation of the stem path data infers a hierarchy, that is, the first stem path is considered the most important, with subsequent stem paths being of lesser importance. A method of global coloring is described below in text, then in pseudocode.

At times it may be necessary to limit the amount of allowed distortion in order to maintain other character features such as overall width, height, etc. This is sometimes referred to as a "pixel budget." When only stems are being controlled, distortions can be compensated for in the counters. Controlling both stems and counters may leave no compensation zones, in which case it is preferable to control only stems. Control over counters must therefore take into account any stem hinting plus the overall distortion to fixed character parameters.

The method of adjusting counters is analogous to other hinting methods so far described: counter sizes are adjusted using device space pixel manipulation of stem edges. When a counter is expanded or contracted, all the stems above or below it must be shifted. The actual method used to determine how to adjust counters and how to prioritize adjustments can be complex. Basically, it utilizes a three step process, grouping, regrouping and adjusting.

First, one identifies groups of counters that fall within some threshold of each other's size. Each counter is tentatively set in a group and averaged and rounded to a common, integer size. Counter order is readily determined from the stem path. Counters are grouped geographically, considering counters in order as a potential group, but not including a non-adjacent counter even if identical in size to a counter in the current group. By traversing each stem path in order, the most important counters can be considered in groups and in hierarchical priority levels. The total dimension of all counters, using the group widths, is calculated and compared to the space available, generally within a predetermined threshold. The threshold may vary with the scaled point size.

The regrouping step apportions any required size adjustments among a group of counters. After grouping and adjusting counters, if the overall size of the character body would be distorted too much, groups can be regrouped and size adjustments reapportioned to minimize size distortions while trying to maximize compliance of counters with global coloring hints. Groups then are identified that result in adjustments that fall within distortion thresholds for a given character. Some objects may have a nondistortion threshold, sometimes referred to as the expansion factor. Characters of a size greater than this threshold should not have counters adjusted.

Stem edges are repositioned as needed to achieve the desired counter size. The resulting new set of "shifts", beyond the shifts for hinting the stems, is used to generate the list of matrices.

Prior to controlling the counters, the stems must be hinted. The data specifying counters is expressed as a series of stems (the stem paths). These stems are hinted in the standard manner (Width, Centering), then the counters between the stems are adjusted. Each repositioned stem is stored in the resident StemList memory and marked with a "locked" flag. Subsequent hstem/vstem commands that affect a stem currently in the StemList need not be hinted, ensuring that counter control is properly reflected on all subsequent stem renderings.

One implementation of these steps is set out in the following pseudocode.

```
PseudoProcedure GlobalColor
read PathCounter[i = 0 to Max] from hints or memory
for i = 0 to Max
    Calculate width adjustments
    Calculate center adjustments
    next i
PixelBudget = Ef * PathLengthDS' #Ef = Expansion factor (e.g. 0.75)
    #PathLengthDS' = Size of Counter Path
j = k = 0
for i = 0 to Max # Collect CounterGroup[j]
    GroupWidth[j] = WidthOfCounter[i]
    GroupMin[j] = GroupMax[j] = WidthOfCounter[i]
#Initialize
    if !WidthOfCounter[i] - GroupWidth[j]! < AllowedWidthVariation
        if (WidthOfCounter[i] < GroupMin[j])
            GroupMin[j] = WidthOfCounter[i]
        if (WidthOfCounter[i] > GroupMax[j])
            GroupMax[j] = WidthOfCounter[i]
        CounterGroup [j, k] = i #compile array of stems in group
    else
        # Calculate the pseudo-mean of the group
        GroupWidth[j] = (GroupMin[j] + GroupMax[j]) / 2
        JMax = j
        j = j + 1; k = 0
    next i
CounterSum = 0
while !CounterSum - PixelBudget! ≤ Tolerance
    # adjust counters as needed to set total to PixelBudget
    for j = 0 to JMax
        #calculate CounterSum = sum of all adjusted counter widths
        CounterSum = CounterSum+GroupWidth[j]*size(CounterGroup [j, k])
    next j
    if CounterSum > PixelBudget, Sign = -1; else Sign = +1
    #readjust GroupWidth[j]'s, starting with maximum value
    for j = j to JMax
```

-continued

```
        GroupWidth[j] = GroupWidth[j] + Sign
        #Groups of counters can have different thresholds of
        allowable dimensions
    Calculate CounterSum
    If !CounterSum - PixelBudget! ≤ Tolerance,
        next j, restarting loop if necessary to further decrement
GroupWidths
    else regroup : subdivide largest group and collect counter
groups again
    # CounterSum is within Tolerance of PixelBudget, calculate
transformation matrix using final counter width values
```

The current method of counter control is an improvement over the global coloring used in the ATM software renderer. The ATM software method groups counters non-geographically, that is, a "group" of counters need not be sequential but can be spread throughout the character body. The current method implements a geographical grouping of counter data. For fonts such as Kanji, geographical counter grouping gives a more desirous result, since counter groups also become visual groups (that is, a group of counters that are close together). One method of counter control is described in U.S. Pat. No. 5,050,103, entitled "Method for Displaying Kanji Characters", assigned to Adobe.

Another difference between the two methods is the current method of calculating group boundaries and average counter size. Counters are grouped until the difference between two sequential counters is greater than a certain threshold. At this point the average counter size for the group is calculated by taking the average of the smallest and largest counter in the group. The calculation of this difference is necessary to minimize the processing time required for counter control and the complexity of the method. The methods for performing adjustments (i.e. splitting groups, pixel budgeting, etc.) are very similar and only differ in methods of implementation.

EXAMPLE

Referring to FIGS. 6a and 7, outlines 121 and 133 show a Helvetica Medium uppercase 'P' in unhinted DS and in hinted, then overlapped DS', respectively. The example which follows assumes a 1000×1000 CS dimension, scaled to approximately 5.9 point at 300 dpi resolution. The drawings include a serif, the small, generally horizontal feature including line segments 131 and 132, for purposes of illustrating certain aspects of the current invention, but the following example pertains to the original character, with no serif.

Type 1 format hint data:

20 –21 hstem 303 83 hstem 635 83 hstem 0 97 vstem 436 100 vstem

Referring to FIG. 6a, 0 97 vstem is vertical stem 122, 436 100 vstem is vertical stem 124, 303 83 hstem is horizontal stem 127 and 635 83 hstem is horizontal stem 125.

Hinting data: (Note: hinted edge positions are for center-width adjustments only)

| CS | DS | Width$_{DS}$ | Center$_{DS}$ | delta$_{width}$ | delta$_{center}$ | DS' |
|---|---|---|---|---|---|---|
| Horizontal Edges | | | | | | |
| (−1,20) | (−0.02458,0.492) | 0.51625 | 0.2335 | +0.1088 | +0.2665 | (0.1875,0.8125) |
| (303,386) | (7.45,9.49) | 2.0404 | 8.47 | −0.1404 | +0.0311 | (7.55,9.45) |
| (635,718) | (15.61,17.65) | 2.0404 | 16.63 | −0.1404 | −0.1306 | (15.55,17.45) |
| Vertical Edges | | | | | | |
| (0,97) | (0,2.38458) | 2.3485 | 1.192 | −0.4846 | −0.19229 | (0.05,1.950) |
| (436,536) | (10.7183,13.17) | 2.45833 | 11.94415 | −0.5583 | +0.05252 | (11.05,12.95) |

Creation of the transformation list:
Horizontal
  zone 0: y<−1 (below the character baseline)
    $C_{fc-y}' = S_y = 0.0245833$
    $K[0] = \text{deltaDS}'[0] = 0$
  zone 1: −1<y<20
    $C_{fc-1}' = (0.8125 - 0.1875)/(20-(-1)) = 0.02976$
    $K[1] = 0.1875 - (0.02976 * -1) = 0.2172$
    {etc.}
  zone 5: 635<y<718
    $C_{fc-y}' = (17.45 - 15.55)/(718 - 635) = 0.02289$
    $K[5] = 15.55 - (-0.02289 * 635) = +1.01374$
  zone 6: y>718
    $C_{fc-y}' = S_y = 0.0245833$
    $K[6] = \text{deltaDS}'[n] = -0.2008$ The complete values for horizontal and vertical $C_{fc-y}$, $C_{fc-x}$ and K are:

| Horizontal Zone | CS | DS | DS | Net Delta | Cfc-y | K |
|---|---|---|---|---|---|---|
| 0 | | | | | 0.0245833 | 0 |
| 1 | −1 | −0.025 | 0.1875 | 0.2121 | 0.0297643 | 0.2172 |
| 2 | 20 | 0.4917 | 0.81252 | 0.3209 | 0.0238073 | 0.3364 |
| 3 | 303 | 7.4487 | 7.54999 | 0.101253 | 0.0228917 | 0.6138 |
| 4 | 386 | 9.4892 | 9.45001 | −0.03915 | 0.0244979 | −0.0062 |
| 5 | 635 | 15.61 | 15.55 | −0.0604 | 0.0228917 | 1.01374 |
| 6 | 718 | 17.651 | 17.45 | −0.2008 | 0.0245833 | −0.2008 |

| Vertical Zone | CS | DS | DS' | Net Delta | Cfc-x | K |
|---|---|---|---|---|---|---|
| 0 | | | | | 0.024583 | 0. |
| 1 | 0 | 0 | 0.05001 | 0.05 | 0.019587 | 0.05 |
| 2 | 97 | 2.38458 | 1.94999 | −0.4 | 0.026844 | −0.654 |
| 3 | 436 | 10.7183 | 11.05 | 0.33 | 0.019 | 2.7659 |
| 4 | 536 | 13.1766 | 12.95 | −0.2 | 0.024583 | −0.227 |

Bezier and Stack Machine
Background

As is well known in the art, a line segment is represented by 2 points each with an x axis and y axis component. For purposes of this disclosure, the origin is designated $P_0$ (the "current" point) and the destination point is designated $P_3$. The distance (delta) between the points is defined by $P_3-P_0$. For line and curve equations and algorithms in general, see William M. Newman and Robert F. Sproull, PRINCIPLES OF INTERACTIVE COMPUTER GRAPHICS (second edition), McGraw-Hill, New York, pp. 309–31, (1979), incorporated herein by reference.

Figure 8A:
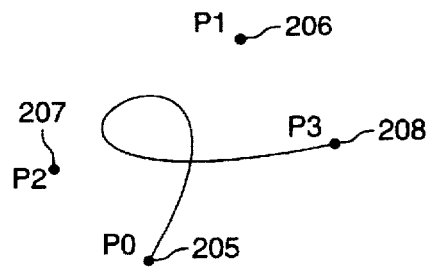
FIGS. 8a and 8b illustrate representative Bezier curves and control points.
Figure 8B:
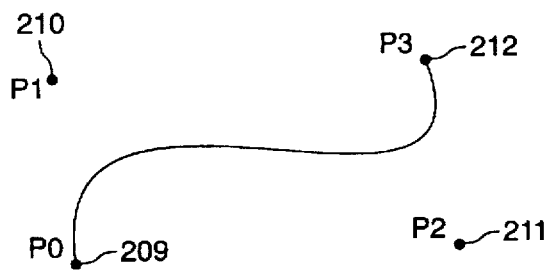
Figure 9:
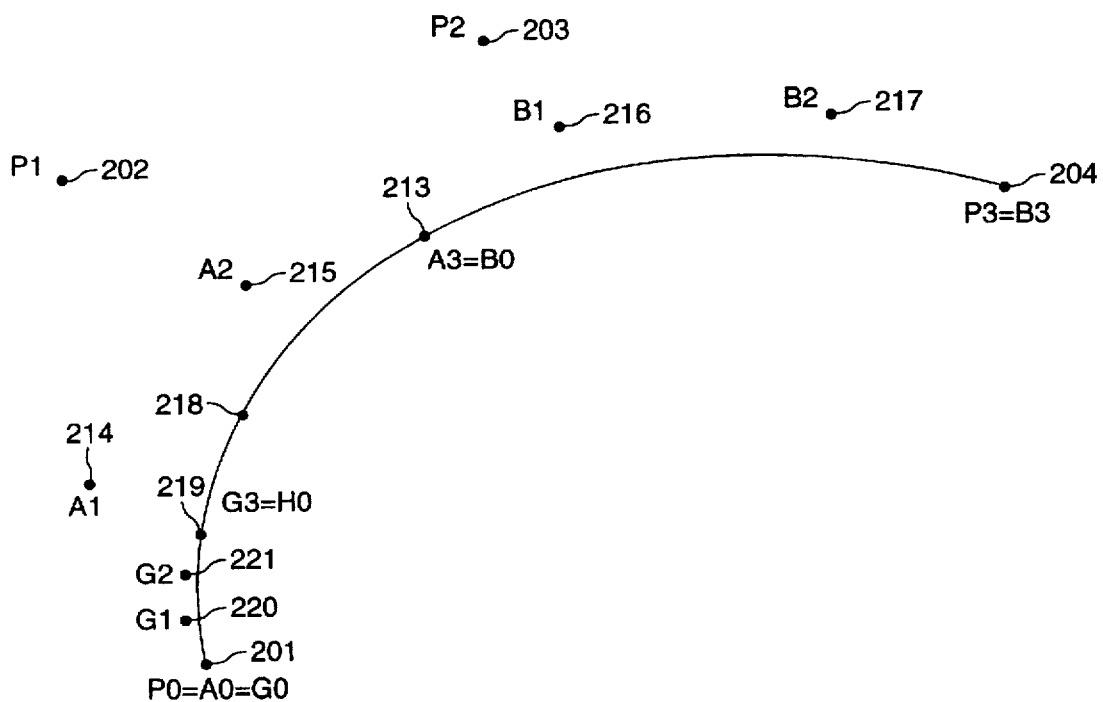
FIG. 9 illustrates subdividing a Bezier curve.

As illustrated in FIGS. 8a, 8b and 9, a cubic Bezier curve is represented by four points, designated for purposes of this disclosure as $P_0$, $P_1$, $P_2$ and $P_3$, each with an x axis and y axis component. Each of these points serves a function in defining a Bezier curve and will be referred to in the generic sense in this specification. At least two of the four points, origin $P_0$ and destination $P_3$, are endpoints which must lie on the curve. The other two points, $P_1$ and $P_2$, are control points. The position of control points $P_1$ and $P_2$ in relation to $P_0$ and $P_3$ determines the shape of the curve. When the control points are sufficiently close to the endpoints or to the Bezier curve, the Bezier curve can be approximated as a straight line with origin $P_0$ and destination $P_3$. FIGS. 8 and 9 illustrate several Bezier curves. Referring to FIGS. 8a, 8b and 9, origin endpoints $P_0$ (201, 205 and 209) and respective destination endpoints $P_3$ (204, 208 and 212) lie at the ends of their respective curves, and control points $P_1$ (202, 206 and 210) and $P_2$ (203, 207 and 211) lie outside of and determine the shape of their respective curves. See generally Brian A. Barsky, Richard H. Bartels, and John C. Beatty, AN INTRODUCTION TO SPLINES FOR USE IN COMPUTER GRAPHICS AND GEOMETRIC MODELING, Morgan Kaufmann Publishers, Inc., Los Altos, Calif. pp. 211–45 (1987), incorporated herein by reference.

Subdivision is a known method used for reducing a Bezier curve to a series of line segments, thus approximating the curve by one or more line segments. Midpoint subdivision divides the original Bezier into two smaller Bezier curves. Each of the two smaller Bezier curves may be subdivided again, producing even smaller Bezier curves. Every subdivision moves the control points $P_1$ and $P_2$ closer to the actual curve. Eventually, the control points will converge and lie on the curve (as a single dot), or be close enough to the curve so that the curve may be approximated by a straight line.

A flatness test is a method for determining if the Bezier curve is sufficiently small so that the curve may be approximated by a straight line. Typical prior art tests use the distance formula to measure the distance of control points $P_1$ and $P_2$ in relation to both points $P_0$ and $P_3$. Although a flatness test is not necessary, since a Bezier curve could be reduced to a single dot, it is generally faster to approximate the Bezier curve with a straight line when it has become sufficiently small in order to end the recursive subdivision process as soon as possible.

Referring to FIG. 9, subdividing the Bezier curve defined by points $P_0$, $P_1$ $P_2$ and $P_3$ yields two smaller Bezier curves, the first with endpoints designated $A_0$, $A_3$, and the second with endpoints designated $B_0$ and $B_3$, and respective control points $A_1$, $A_2$, and $B_1$, $B_2$. The following is the general formula for midpoint subdivision of a cubic Bezier:

$A_0 = P_0$
$A_1 = \frac{1}{2}(P_0 + P_1)$
$A_2 = \frac{1}{4}(P_0 + 2P_1 + P_2)$
$A_3 = \frac{1}{8}(P_0 + 3P_1 + 3P_2 + P_3)$
$B_0 = \frac{1}{8}(P_0 + 3P_1 + 3P_2 + P_3)$
$B_1 = \frac{1}{4}(P_1 + 2P_2 + P_3)$
$B_2 = \frac{1}{2}(P_2 + P_3)$
$B_3 = P_3$ FIG. 9 illustrates a subdivided Bezier curve with endpoints 201 and 204, the first division at midpoint 213

(destination $A_3$ and also origin $B_0$). The resulting two smaller curves have endpoints and $A_0$ and $A_3$ and endpoints $B_0$ and $B_3$. One method of dividing at midpoint 219 (destination point $G_3$ and origin $H_0$) and the resulting curve with endpoints and control points $G_0$–$G_3$ (201, 220, 221 and 219).

Implementation

Figure 10:
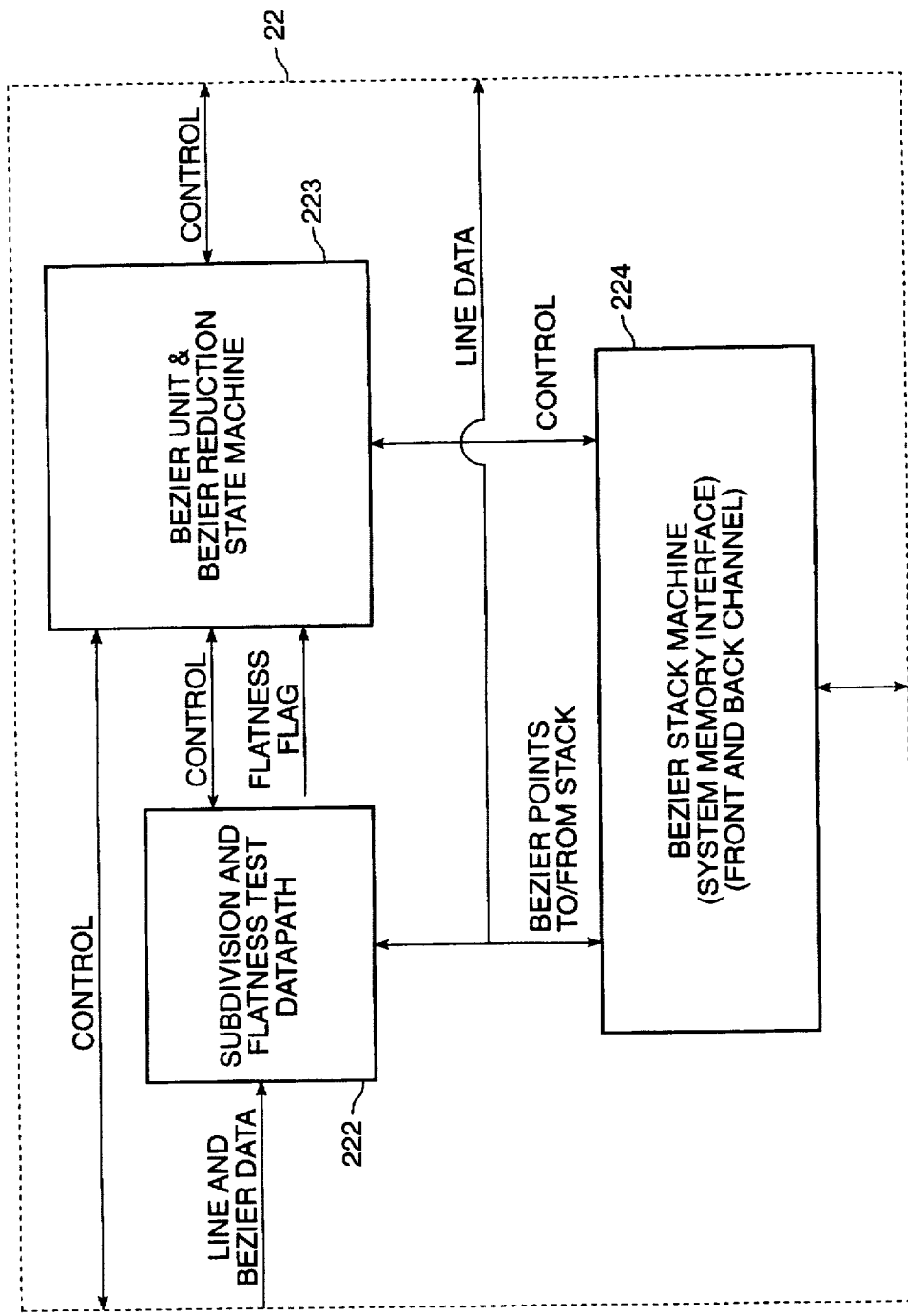
FIG. 10 illustrates the major functional blocks of the Bezier and state machine.
Figure 11A:
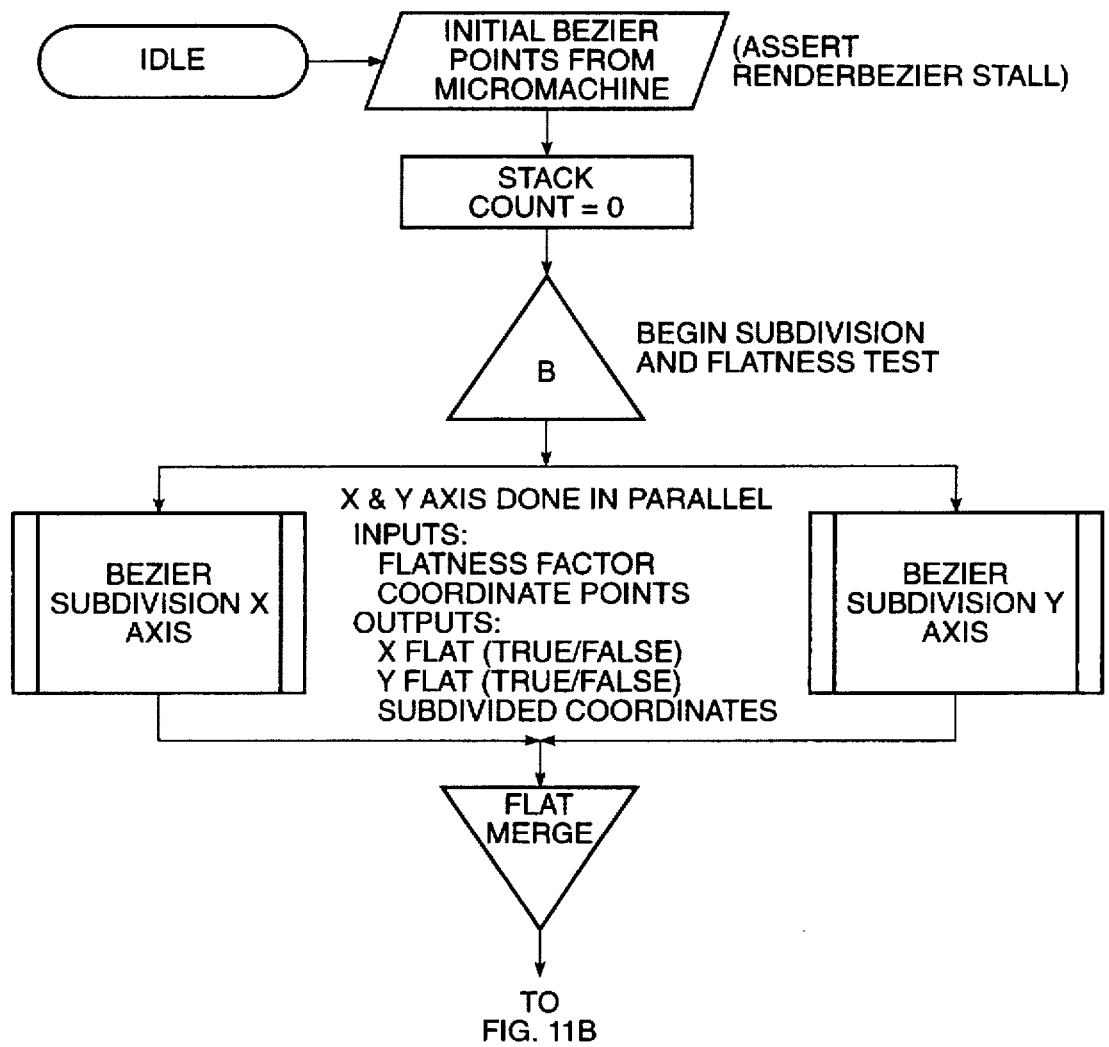
FIGS. 11a and 11b illustrate the major steps in the method of subdividing Bezier curves and calculating flatness.
Figure 11B:
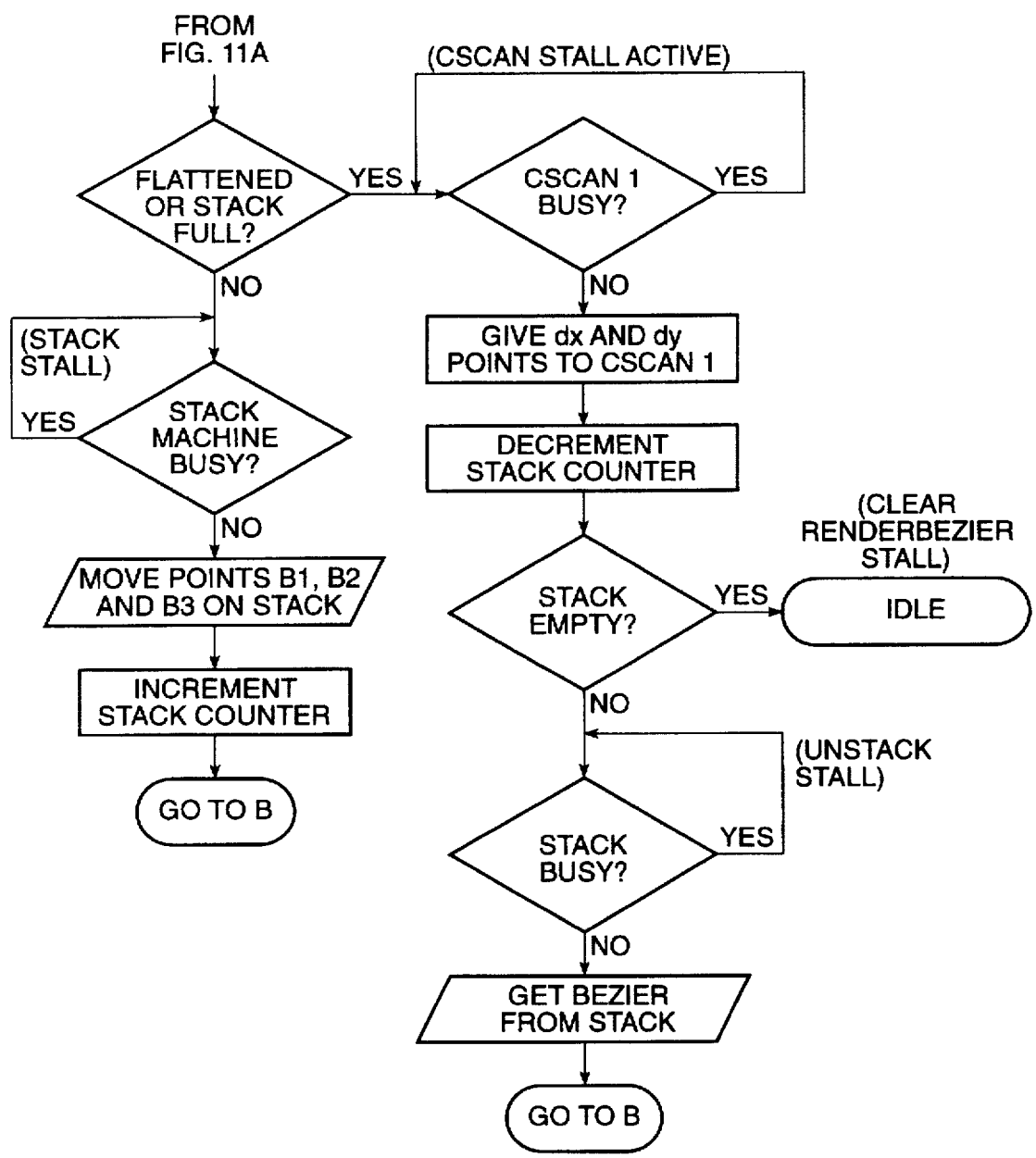

Referring to FIG. 10, Bezier and stack machine 22 is comprised of Subdivision and Flatness Test Datapath 222, Bezier Reduction state machine 223 and Bezier Stack Machine 224. Bezier and stack machine 22 accepts a set of scaled coordinate points as input from micromachine 21 (FIG. 2), processes the data based on the graphic operation (line segment or Bezier curve), and outputs the delta x and delta y value as a vector for a line segment or a series of delta x and delta y values for a Bezier curve to Cscan unit 23. Bezier and stack machine 22 is composed of Bezier Unit and Bezier reduction state machine 223, which in turn includes a Bezier X axis unit and a Bezier Y axis unit, and Bezier stack machine 224, which in turn includes a stacker and an unstacker.

The Bezier X axis unit and the Bezier Y axis unit in 223 execute in parallel. For convenience, the subsequent discussion refers to the abbreviated name Bezier unit 223 where the operations are identical for both the Bezier X and Y axis Units.

Bezier unit 223 processes input consisting of line segments by the one step operation of subtracting the current point ($P_0$) from the destination point ($P_3$), then passing the resulting delta value, essentially a vector, to Cscan unit 23 (FIG. 2). Bezier unit 223 can then accept another job.

Processing input consisting of a Bezier curve is more complex. Referring to FIGS. 10, 11a, 11b and 12 and using the method outlined in those figures, Bezier unit 223 initiates the multi-step operations of the midpoint subdivision and flatness test. The midpoint subdivision and flatness test implemented in Bezier unit 223 has been optimized for hardware implementation. Both of these tasks are performed in parallel, and the math has been reduced to adds, subtracts, and shifts (power-of-two multiply and divide). Because the tests of subdivision and flatness are executed in parallel, the following decision is made at the end of the subdivision and flatness test as to the next operation:

If the Bezier curve has passed the flatness test in both the x and y axis, the results from the subdivision are ignored and the Bezier curve is considered to be approximated by a straight line. Delta x and delta y values are passed to Cscan unit 23 as XLineData and YLineData. At this point Bezier and stack machine 22 checks to see if any Bezier control points have been stacked as a result of a prior subdivision. If the stack is not empty, the unstacker unit unstacks the Bezier data, and the subdivision and flatness test operations are performed again. If the stack is empty, Bezier and stack machine 22 has finished processing the original Bezier curve and waits for micromachine 21 (FIG. 2) to provide new data.

If the Bezier curve fails the flatness test in one or both axes, the results from the subdivision are used and the Bezier is divided into two smaller Bezier curves (P' and P" or A and B in FIG. 9). Still referring to FIG. 10, because Bezier unit 223 only processes one Bezier curve at a time, the second of the two smaller Bezier curves (P") is written to a stack by Bezier stack machine 224. To conserve space, the stacked points are normalized ($P_0$" is subtracted out from other points). This allows stacking only three points in each axis ($P_1$", $P_2$" and $P_3$") instead of four points; $P_0$" is zero. With the second Bezier curve stacked, Bezier unit 223 is ready to execute the subdivision and flatness test of the first of the two smaller Bezier curves (P').

To save space and to accommodate a finite stack area, the number of elements on the stack is set to a maximum. In the current co-processor implementation, the stack depth is set at sixteen (384 bytes). If a Bezier curve fails the flatness test and the stack is full, the Bezier curve is treated as though it passed the flatness test and is thus approximated by a line segment.

The prior art midpoint subdivision method has been optimized for use by the FRC as described below. Note that point $P_0$ is set equal to zero points $P_1$–$P_3$ have been normalized by reference to $P_0$, which simplifies some of the math. Division by two (a power-of-two divide) is easily implemented in hardware as a single downshift (notated as >>).

TEMP=½($P_1$+$P_2$)=(($P_1$+$P_2$)>>1)

$A_0$=$P_0$=o $A_1$=½($P_0$+$P_1$)=½($P_1$)=($P_1$>>1)

$A_2$=½($A_1$+TEMP)=(($A_1$+TEMP)>>1)

$A_3$=$B_0$=½($A_2$+$B_1$)=(($A_2$+$B_1$)>>1)

$B_1$=½($B_2$+TEMP)=(($B_2$+TEMP)>>1)

$B_2$=½($P_2$+$P_3$)=(($P_2$+$P_3$)>>1)

$B_3$=$P_3$

The flatness test in the FRC is optimized for hardware implementation. The test requires only simple adds and shifts (power-of-two multiply and divide) as opposed to a distance formula requiring non-power-of-two multiplies and square root operations. Referring to FIG. 9, the flatness test evaluates the position of control points $P_1$ and $P_2$ (202 and 203) in relation to destination endpoint 204 ($P_3$). When the normalized coordinates of 202 (the x and y values) are each within a flatness factor of ⅓ of the normalized coordinates 204 (the x and y values), and the normalized coordinates 203 (the x and y values) are each within a flatness factor of ⅔ of the normalized coordinates 204 (the x and y values), the Bezier curve is considered flat.

FlatC$_1$=FF–ABS($P_3$–(3*$P_1$))=FF–ABS($P_3$–(($P_1$<<1)+$P_1$))

FlatC$_2$=FF–ABS($P_3$–(3/2*$P_2$))=FF–ABS($P_3$–(($P_2$>>1)+$P_2$))

where ABS is the Absolute Value function and FF is a FlatnessFactor (tolerance) passed to Bezier and stack machine 22 by micromachine 21.

Figure 12:
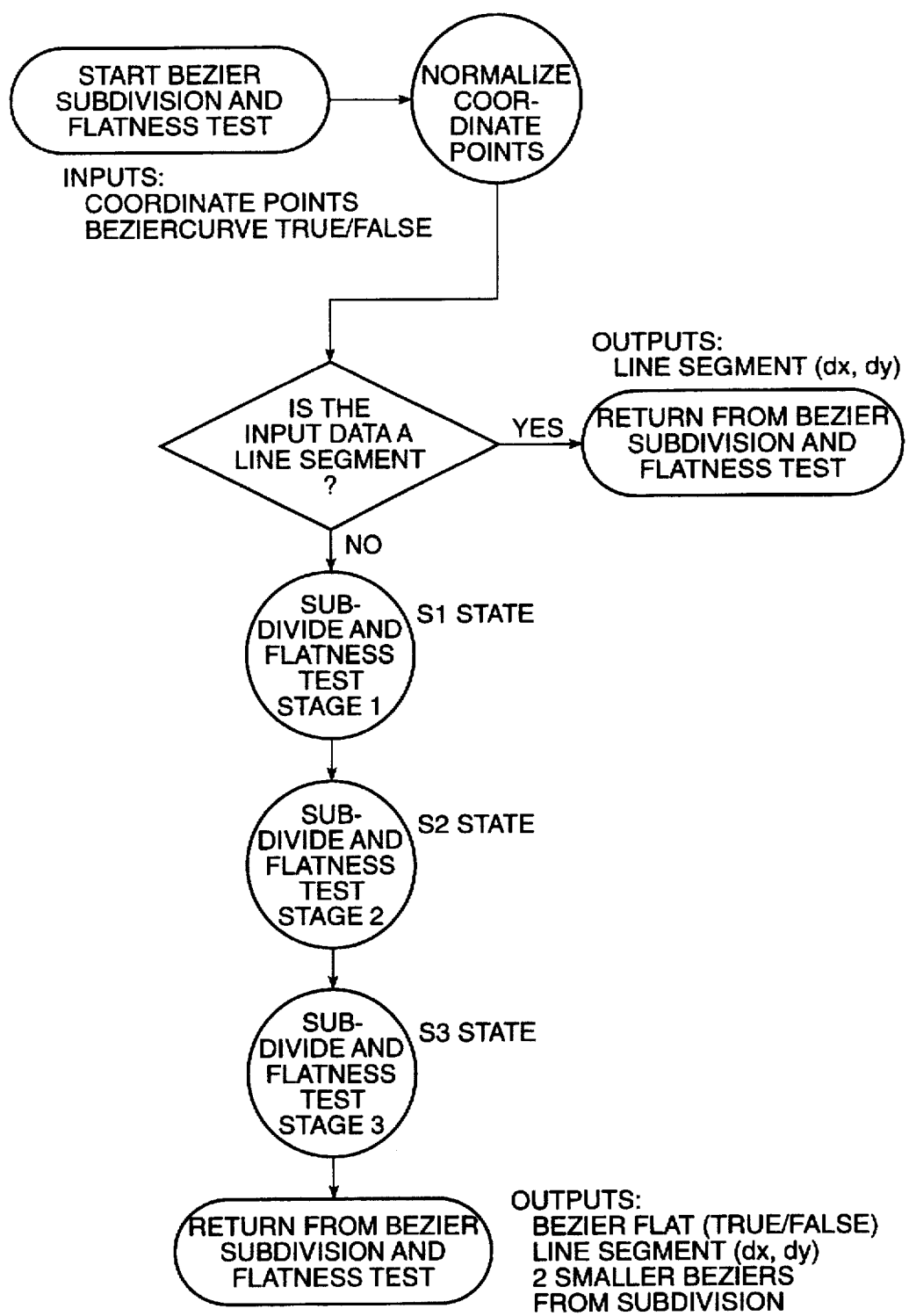
FIG. 12 illustrates the major steps in the method of determining flatness.

Referring to FIG. 12, the following steps constitute midpoint subdivision and the flatness test of Bezier curve P to give two subdivided curves:

Step 1:

Normalize Points, with reference to $P_0$. RP$_n$ is a temporary point.

RP$_3$=$P_3$–$P_0$

RP$_2$=$P_2$–$P_0$

RP$_1$=$P_1$–$P_0$

RP$_0$=0

Step 2:

Stage 1 of subdivision and flatness test.

TEMP$_1$=((RP$_1$+RP$_2$)>>1)

$B_2$=RP$_2$+RP$_3$ $B_3$=RP$_3$ $A_1$=(RP$_1$>>1)

$A_0$=RP$_0$

TEMP$_C$=((RP$_1$<<1)+RP$_1$)

TEMP$_D$=((RP$_2$>>1)+RP$_2$)

Step 3:
Stage 2 of subdivision and flatness test.
$B_1=((TEMP_1+B_2)>>1)$
$A_2=((TEMP_1+A_1)>>1)$
$TEMP_C=RP_3-TEMP_C$
$TEMP_D=RP_3-TEMP_D$
Step 4:
Stage 3 of subdivision and flatness test.
$A_3=B_0=((B_1+B_2)>>1)$
$FlatC_1=FlatnessFactor+/-TEMP_C$
$FlatC_2=FlatnessFactor+/-TEMP_D$ In determining $FlatC_1$, if $TEMP_C$ is less than zero, then addition is performed. If $TEMP_C$ is zero or greater, then a subtraction is performed. The same applies to $TEMP_D$. This is the equivalent of having:
$FlatC_1=FlatnessFactor-ABS(TEMP_C)$
$FlatC_2=FlatnessFactor-ABS(TEMP_D)$ Thus in four steps (clock cycles) it can be determined if the Bezier curve is flat or requires further subdivisions using the two new Bezier curves. The need for four steps is based on using Bezier units with four adder/subtractor units. Increasing the number of adder/subtractor units would decrease the number of steps required to execute the subdivision and flatness test. Conversely, decreasing the number of adder/subtractor units would increase the number of steps required to execute the subdivision and flatness test. One skilled in the art will recognize how to modify the present teaching to implement the method in other configurations.

Based on the above method, flatness is determined if both $FlatC_1$ and $FlatC_2$ are greater than zero. If either is negative or zero, the Bezier curve has failed the flatness test and must be subdivided further. Similar tests are performed in the Y dimension and all four flatness tests must be satisfied before the curve is considered flat.

Cscan Unit 23

Figure 13:
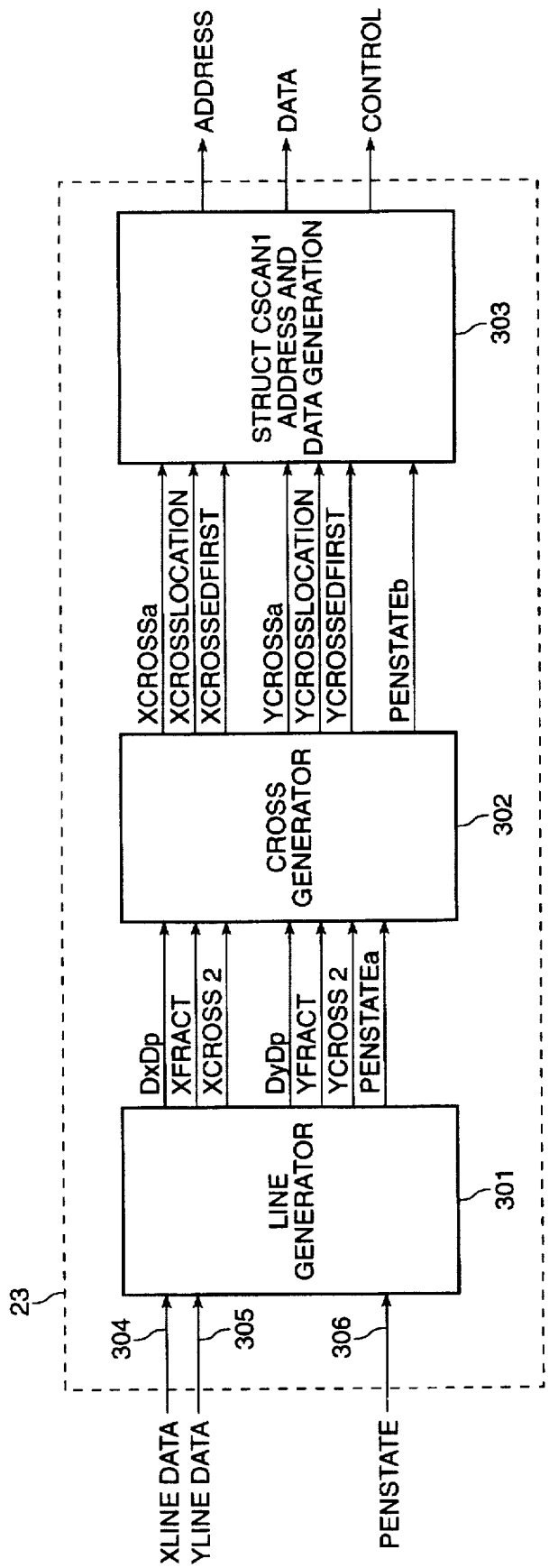
FIG. 13 illustrates the major functional blocks of the Cscan unit.

Referring to FIG. 13, Cscan unit 23 combines the outline of a character, which is a series of connected line segments in the form of vectors, with fill logic to select which pixels will be displayed in the character bit map. Cscan unit 23 includes three principal units, line generator 301, cross generator 302 and structure (Struct CSCAN1) address and data generator (SADG) 303.

Line generator 301 converts a line described by the end points (0,0) and XLineData, YLineData) into a series of mid-line cross events. Cross generator 302 converts the series of identified mid-line crosses into a series of mid-line crosses with the exact location of the cross specified. SADG 303 converts the mid-line crosses and location specifications passed to it by cross generator 302 into a series of memory accesses that form the CScan Tile Data Structure. The CScan Tile Data Structure is subsequently processed by the CScan2 fill process to produce the bit map that forms the character.

Line Generator 301

Line generator 301 receives descriptions of lines from Bezier and stack machine 22 (FIG. 2). Each incoming line is normalized, described simply by its relative ending point (XLineData on input 304, YLineData on input 305). XLine-Data and YLineData are the X and Y coordinates of point $P_3$ passed from Bezier and stack machine 22. Additionally, Bezier and stack machine 22 passes a signal on line 306 that specifies whether the line is to be rendered black (PenState=DOWN) or white (PenState=UP). White lines are used to connect bodies made up of closed paths of black lines. The PenState information is not used by line generator 301 and is merely passed on to cross generator 302.

The (XLineData, YLineData) coordinate is presented in the form of a 24-bit signed number with a precision of [16.8] (meaning the coordinate can range from −32768 to 32767, a 15 bit signed integer with a fractional component resolved to 1/256th, 8 fraction bits, of a device coordinate). The notation [i.ff] indicates that the number is a signed i bit number with i integer bits and ff fractional bits.

Line generator 301 processes this data in a two step process using DDAs which are well known in the art:

i) Scale the data and loop count so that the increment, Dp, traveled during each loop (each clock cycle) is between ½ and 1 device space coordinate in magnitude. This step happens only once per line.

ii) Process an increment, Dp, with the line generating DDAs (described below) and present DxDp, DyDp, XCross, YCross, XFract, and YFract to cross generator 302 if necessary. This process happens many times, depending on the magnitude of the line being generated.

Typical prior art methods divide a line into a fixed number of segments, requiring the same number of divisions and calculations, no matter whether a line crosses many pixels or only a fraction of one. The present method of scaling guarantees that a cross or absence of a cross within the line segment will be identified within a maximum of two iterations of line generator 301, resulting in faster processing.

Line Generating DDAs

Digital differential analyzers (DDAs) have been used for many years to convert a differential equation for a line or curve into incremental units, for example, a bit map. See generally, William M. Newman and Robert F. Sproull (1979), PRINCIPLES OF INTERACTIVE COMPUTER GRAPHICS (second edition), McGraw-Hill, New York. pp. 22–28, incorporated herein by reference.

Figure 14:
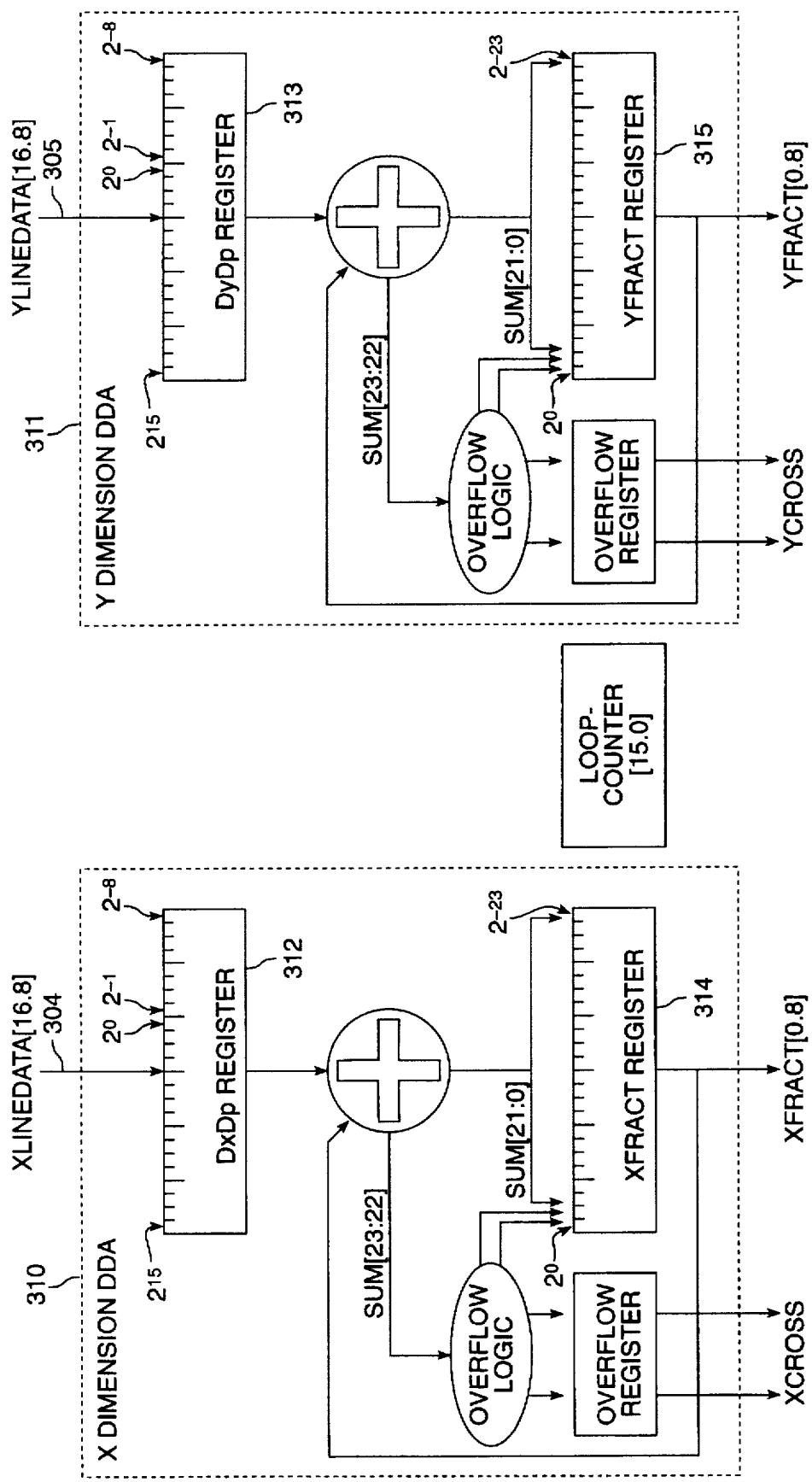
FIG. 14 illustrates line generating DDAS.

Referring to FIG. 14, line generator 301 includes line generating DDAs 310 and 311 for X and Y components, respectively, and XFract register 314 and YFract register 315 for accumulating and holding cumulative error terms. In this configuration, the XLineData becomes the differential variable DxDp where "p" is the parametric variable that will be incremented as the DDA processes the line. Similarly, YLineData becomes DyDp. Since the weighting of the DxDp and DyDp variables are [16.8] and the weighting of the registered fractional values XFract and YFract are [1.23], a loop count of $2^{15}$ will process the entire line. Each iteration of the loop is processed in a single clock cycle. After each iteration, the fractional values XFract and YFract represent the sub-pixel location of the end of that iteration, and the XCross and YCross variables represent the occurrence and sign of a mid-line cross in the X and/or Y directions, respectively. This information as well as DxDp, DyDp, and PenState are passed to cross generator 302.

Scaling Circuit

It is desirable to process every line in a minimum number of clock cycles so line generator 301 implements a data and loop count scaling circuit. In the preferred implementation, the maximum is set to 215, which allows a 16 bit signed integer portion. The design choice accommodates a line up to 32767 bits long, which corresponds to an approximately 9.1 inch line at 3600 dpi resolution. Referring to FIG. 14, prior to loading the XLineData and YLineData into the DxDp register 312 and DyDp register 313, a shifting circuit (not shown) shifts XLineData and YLineData up together as much as possible without losing significant data, but not more than 15 bits, and shifts the loop count down by the same amount. In other words, leading zeros are removed from the larger of XLineData and YLineData. This assures that each iteration processed by DDAs 310 and 311 will evaluate a line segment of somewhere between ½ and 1 device space coordinate units. This is optimal from a performance perspective because each iteration produces no more than one XCross and one YCross, while guaranteeing a cross will be identified within a maximum of two iterations.

Most line segments from Bezier and stack machine 22 (FIG. 2) will be greater than about ½ pixel in length, since the flatness test is based on the dimension of the pixels. Some line segments, however, may be quite short, for example, where the original character contains detailed, linear or angular features such as the serif composed in part of edges 131 and 132 in FIG. 6a. If a line segment does not include any crosses, the scaling unit will not subdivide the segment at all and line generator 301 (FIG. 13) will determine in a single iteration that there is no cross. In such a case, XFract and YFract values are updated to reflect the current position of the last line segment, and no c ross is p ass ed to cross generator 302 (FIG. 13).

Cross Generator 302

Referring to FIG. 13, at essentially each iteration and for each dimension, line generator 301 passes a signal to cross generator 302, indicating that a midline cross occurred, along with a signal indicating the direction (positive or negative) of the cross, the DnDp value of the line being generated, and the NFract fractional pixel value of the end of the line segment associated with the iteration, where n=x or y and N=X or Y. Pixels are subdivided into a number of subunits, the exact number being a design choice made considering higher resolution versus storage requirements. The current implementation utilizes eight subdivisions in each of x and y dimensions. Cross generator 302 determines the exact location of the cross (in each dimension) using a unique sub-division method.

Figure 15A:
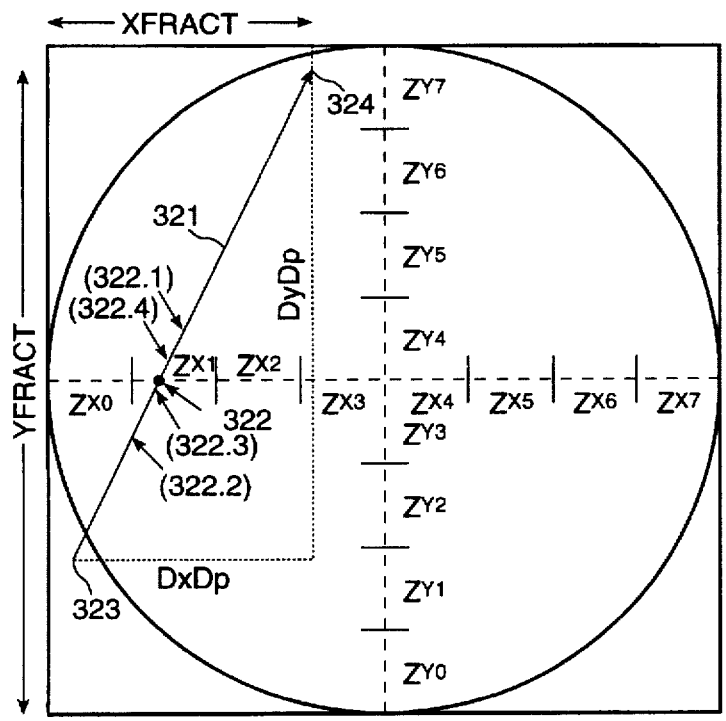
FIGS. 15a and 15b illustrate crosses and subdivided pixels.

Referring to FIG. 15a, short line vector 321 represents typical information passed from line generator 301 (FIG. 13). Given DxDp, DyDp, XFract, and YFract from DDAs 310 and 311 (FIG. 14), cross generator 302 (FIG. 13) determines the zone (Z-N0–Z-N7) in which cross point 322 actually occurs. This is accomplished using a subdivision method described by the following pseudo-program:

Current XFract=XFract
Current YFract=YFract
Current DxDp=DxDp
Current DyDp=DyDp
Loop until desired resolution is obtained
NewDxDp=CurrentDxDp/2
NewDyDp=CurrentDyDp/2
NewXFract=CurrentXFract-NewDxDp
NewYFract=CurrentYFract-NewDyDp
CurrentDxDp=NewDxDp
CurrentDyDp=NewDyDp
if (NewY(or X)Fract crosses back over Y (or X) midline)
    CurrentYFract=CurrentYFract
    CurrentXFract=CurrentXFract
else
    CurrentYFract=NewYFract
    CurrentXFract=NewXFract
zone=CurrentXFract (or CurrentYFract) truncated to desired resolution Line segment 321 is divided in half at 322.1, which has crossed the X axis, so the lower portion is divided at 322.2. This follows a cross, so the intervening portion is subdivided at 322.3. This did not result in a cross so the subsequent divided segment is further divided at 322.4. This gives a cross and the resolution is satisfactory so no further subdivision is required. There is no XCross in this segment but the values of XFract and YFract are maintained as a starting point for the next line segment to be processed.

Figure 15B:
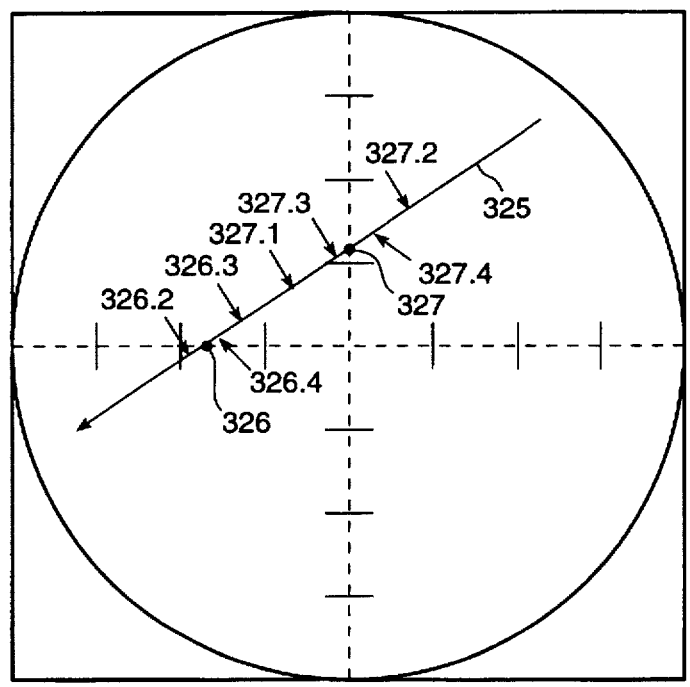

Referring to FIG. 15b, which includes the same zones marked in FIG. 15a, line vector 325 illustrates the occurrence of both an XCross at cross point 327 and a YCross at cross point 326. An "XCross" is a crossing of the vertical Y axis while travelling in an X direction. A YCross crosses the horizontal x axis while travelling in the Y direction. Cross generator 302 (FIG. 13) also evaluates which midline cross happened first by examining the zone at which a particular midline is crossed and seeing if the midline of the orthogonal direction has yet been crossed. Since the XCross at cross point 327 in zone Z-Y5 is closer to the origin of line vector 325, the YCross at cross point 326 has not yet occurred, therefore the XCross happened first. Conversely, looking at the YCross at cross point 326 in zone Z-X3, the XCross has already occurred, therefore the YCross must have happened after the XCross. The order of crosses is stored.

Structure Address and Data Generator (SADG) 303

SADG 303 (FIG. 13) receives cross and location data and builds a two dimensional data structure in a memory array that can later be used by the CScan2 process to generate the object's bit map. SADG 303 creates a data structure, called the tile structure, with an X dimension, Y dimension, and Z dimension. SADG 303 stores, for x and y dimensions, whether there was a cross. To maximize storage efficiency, if there are any crosses adjacent to a given pixel, the x or y dimension, polarity and zone of each cross in a variable depth structure, effectively in a Z dimension. The tile structure can be of any desired dimension, typically equal to the buffer capacity of the FRC. Each tile is divided into zones, as illustrated in FIG. 15a and in FIG. 17.

Figure 16:
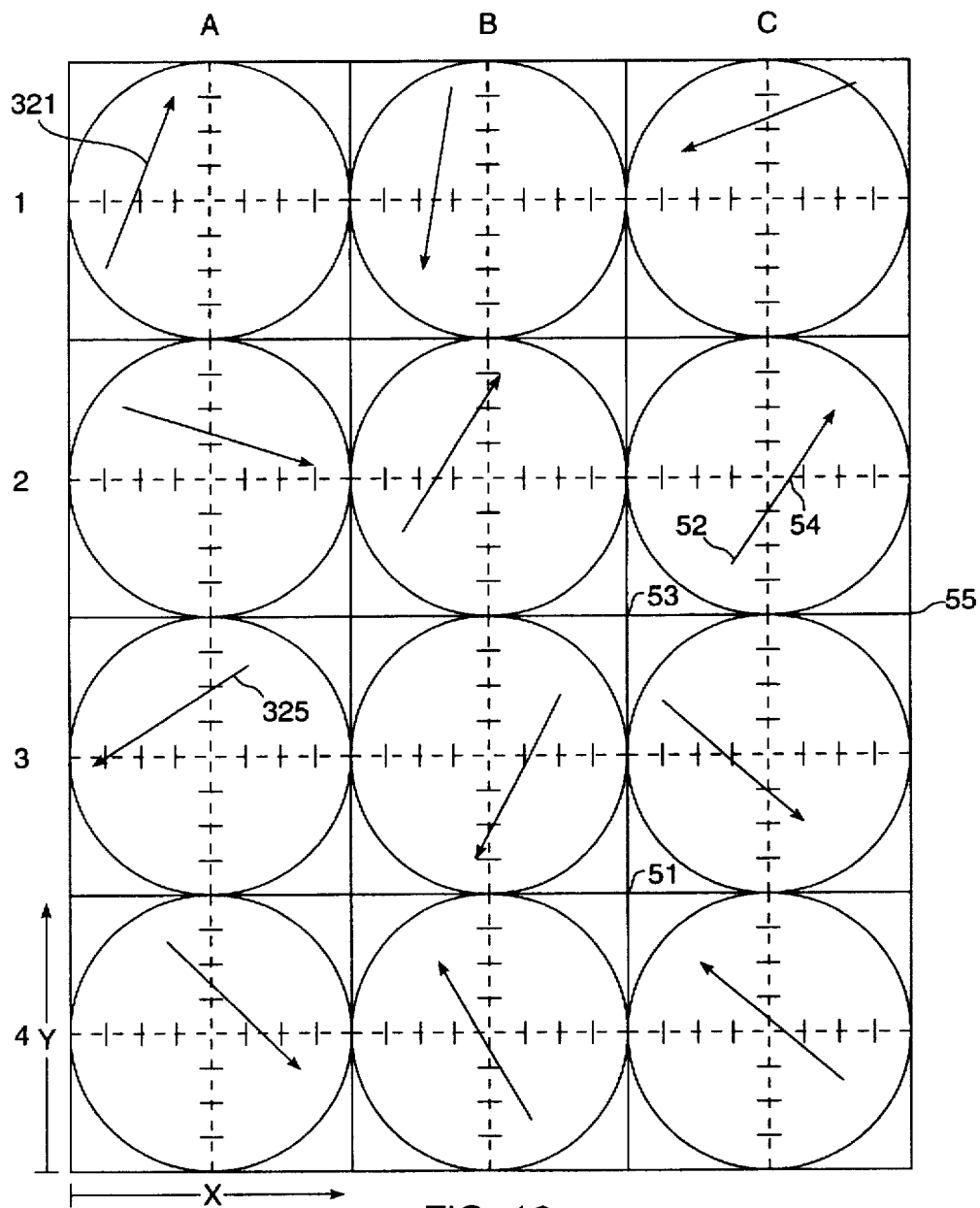
FIG. 16 illustrates a tile structure of pixels.

Representative cross combinations (irrespective of zones) are illustrated in FIG. 16. For each type of cross, SADG 303 (FIG. 13) determines the appropriate X and Y zone values to store in the Z dimension, including direction and order of each cross. Line segment 321 in tile cell A1 includes a Positive YCross and no other crosses. The line segment in tile B1 includes a Negative YCross. Line segment 54 includes a positive XYCross, in the order X followed by Y. The line segment in tile B2 includes a positive YXCross, where the YCross precedes the XCross. Line segment 325 in tile A3 includes a negative XYCross.

Figure 17:
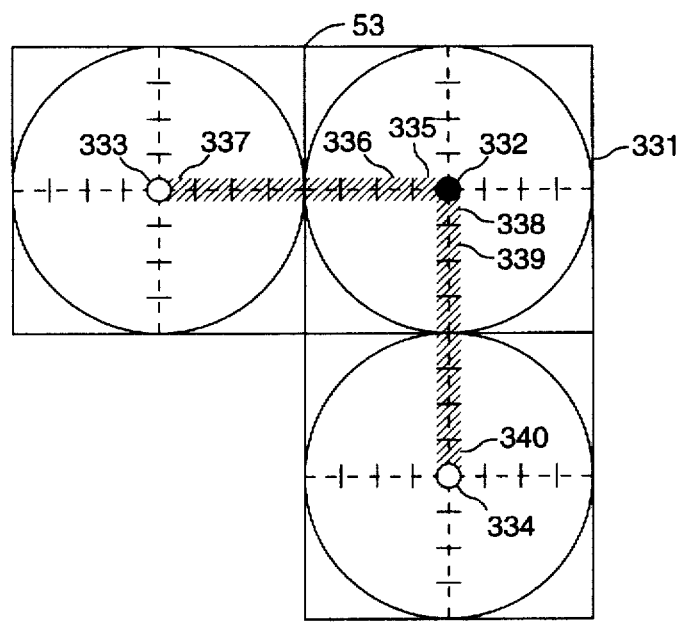
FIG. 17 illustrates a close up of the tile structure of FIG. 16.

FIG. 17 illustrates a tile containing pixel 332 and shows two adjacent pixels having centers 333 and 334. Each pixel is divided into zones, as illustrated in FIG. 15a, identified as zones Z-Y1, etc. In FIG. 17, these zones in the illustrated tile are zones 337 (Z-X4) through 335 (Z-X3) and zones 340 (Z-Y4) through 338 (Z-Y3). The addressing into the tile structure is managed by two pointers, TOX (Tile Offset X) and TOY (Tile Offset Y), which can reference fractional pixel values. These pointers are initialized at the start of each new character.

Referring to FIG. 17, the stored zones for pixel 331 are calculated with reference to its pixel center 332. The zones can be considered at multiple resolutions. In a low resolution mode, crosses are recorded as taking place simply as a Y cross (any place along the midline between pixel centers 332 and 333) and/or as an X cross (any place along the midline between pixel centers 332 and 334). In a high resolution mode, Y crosses are recorded with the zone 335 (Z-X3), 336 (Z-X2), . . . , 337 (Z-X4) and X crosses are recorded with corresponding zones 338 (Z-Y3), 339 (Z-Y2), . . . , 340 (Z-Y4). The zones are numbered as shown to facilitate other calculations. After a cross has been stored, the TOX and TOY pointers are updated to reflect the end point of the line vector just processed.

Overtracing

Figure 19:
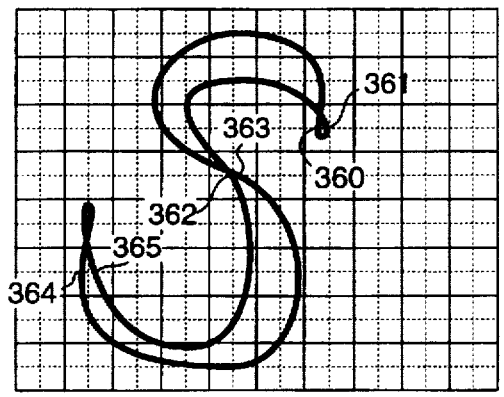
FIG. 19 illustrates overtracing.

An important feature of SADG 303 (FIG. 13) is its ability to handle curves that trace over themselves in the same zone. For example, referring to FIG. 19, one portion of the outline may cross in one direction between two pixels centers and another portion of the outline may cross in another direction between the same pixel centers. The crosses may be in different pixel subdivisions, for example, crosses 360 and 361 or crosses 364 and 365, or may be in the same subdivision, for example, crosses 362 and 363. Ordinarily, no pixels need to be filled since a center point cannot exist between two such overlapping crosses. However, in order to provide dropout and collision correction in the CScan2 process, Cscan unit 23 (FIG. 2) not only stores cross events at particular zones, it also stores the parity of crosses at that zone and the direction (positive or negative) of the last cross within that zone.

CScan2 Fill Process

The CScan2 fill process is responsible for reading the Tile Structure after it has been generated by Cscan unit 23 (FIG. 2), and turns it into a bit map rendering of the desired character or object. The result of the CScan2 fill process is the desired bit map of the character. This bit map can be stored in memory 13B, can be used directly to display the character on a raster monitor, or can be used to print the character on a raster printing device (such as a laser printer).

The CScan2 fill process is best described by the pseudo program given below:

```
For Y = minimumTOY to maximumTOY
    For X = minimumTOX to maximumTOX
        read Tile Structure (X,Y)
        mapBit (X,Y) = evenOddFill (TileStructure(X,Y))
        if (dropOutCollisionFlag)
            gosub dropOutCollisionFixup
    Next X
Next Y
```

Bit (X,Y) is mapped if evenOddFill is true. The function evenOddFill essentially permits traditional center point fill for a character. In scanning a row (for X=minimumTOX to maximumTOX), evenOddFill is false until TileStructure(X,Y) contains a single X cross, in which case evenOddFill is set true, changing "color" by displaying the current and subsequent pixels until TileStructure(X,Y) contains a second single X cross, when evenOddFill is set false. In a typical scan for a figure where the outline is defined in a counter-clockwise direction, the first X cross encountered in a row should be of "downward" polarity. Subsequent crosses should alternate polarity for a simple character. The function evenoddFill will switch states each time a single X cross is encountered. The function evenOddFill sets dropOutCollisionFlag when it identifies a dropout or collision (a collision is nothing more than a dropout of a white pixel), which can be detected when the parity of the cross data between two pixel centers is even and non-zero. Each row should contain an even number of crosses so by the end of each row, evenOddFill should be false. If there is more than one cross between two pixel centers and parity is balanced, a dropout flag is set. Parity may be unbalanced if there are more crosses of one direction than the other, e.g. two down and one up. The simplest treatment is to change the pixel display state as for a single cross, but set a dropout flag where it is needed.

Figure 20:
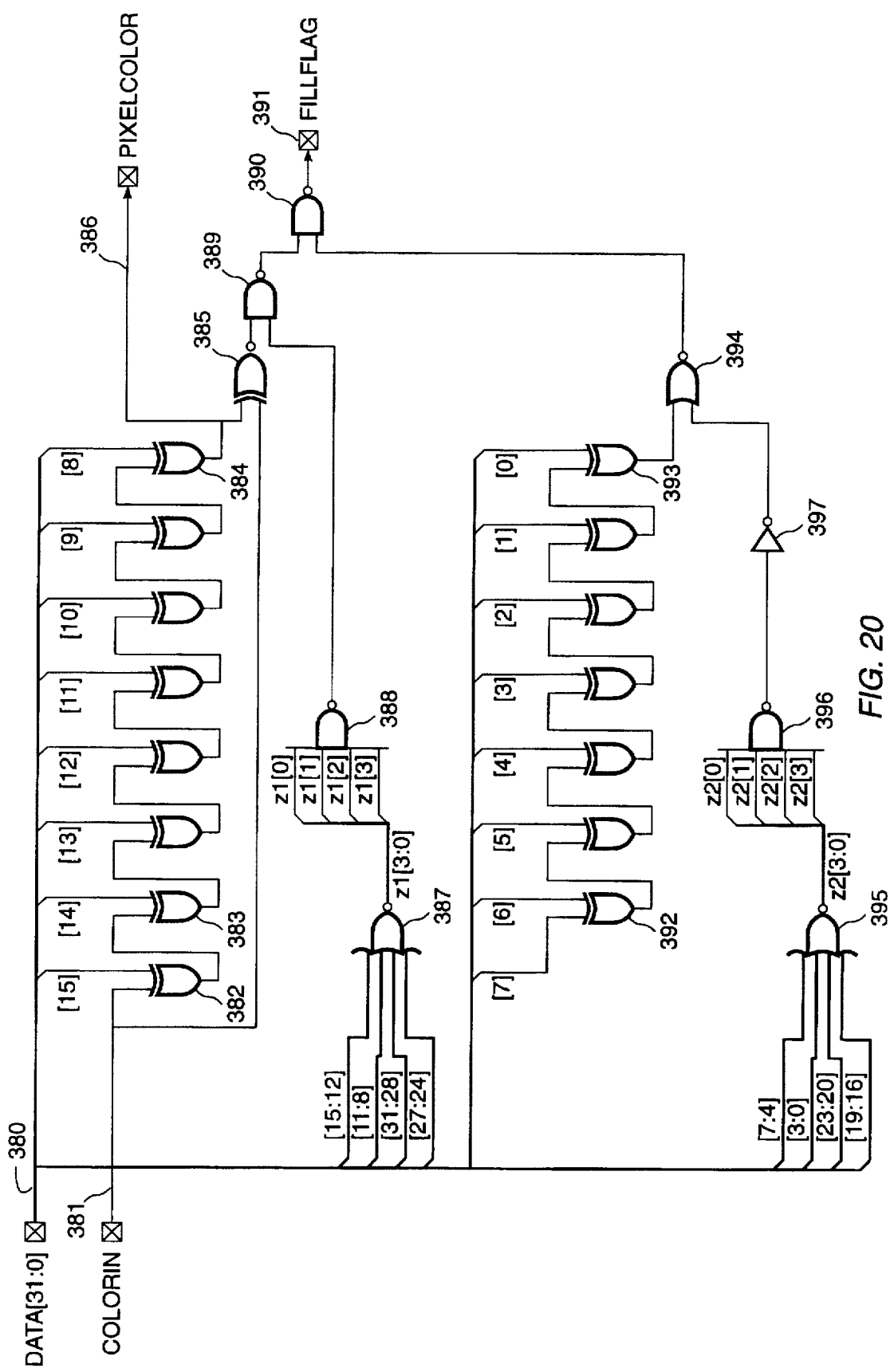
FIG. 20 illustrates a hardware fill and dropout detection circuit.

The evenOddFill function can be implemented using the circuit shown in FIG. 20. By XORing together lines which contain the flag for each pixel zone indicating whether a cross occurs, the number of flags set gives the pixel color directly and also indicates whether there is a dropout condition. Data[31:0] input comprises XCross information for 8 zones on lines [0] through [7], YCross information on lines [8] through [15], XCrossSign information on lines [16] through [23] and YCrossSign information on lines [24]–[31]. Bus 380 distributes the data throughout the circuit. Lines 8 through 15 are serially XOR'd through gates 382, 383 through 384 to test for crosses. The YCross and YCrossSign data is NOR'd through gate 387 then NAND'd through 388. The XCross and XCrossSign information is combined using gates 392 through 397 to set dropout tests.

If evenOddFill detects sequential crosses of the same polarity, it can be set to change states for filled interiors, or to remain unchanged for empty interiors. The function evenOddFill can track winding numbers to keep track of cross polarities. See U.S. patent application Ser. No. 388, 336, discussed above, incorporated herein by reference, for a discussion of winding numbers and their applications.

Routine dropOutCollisionFixup

Because center point fill sets to black only pixels whose centers are within the contour outline, and sets to white those pixels whose centers are outside the contour outline, dropout and collision conditions occur. When the dropOutCollisionFlag is set, the following rules are used:

First, determine which dimension is experiencing the dropout. If the parity of crosses between a pixel center and the pixel below it is even and non-zero, an XDropout has occurred. If the parity of crosses between a pixel center and the pixel to its left is even and non-zero, a YDropout has occurred. In some instances, both X and Y dropouts occur.

To fix the dropout condition, set one of the two pixels (corresponding to the two pixel centers with the dropout condition between them) to black. Decide which pixel to set black using the following rules, applying each rule to XDropout, as described, then to YDropout, by analogy, until a decision can be made.

Figure 18A:
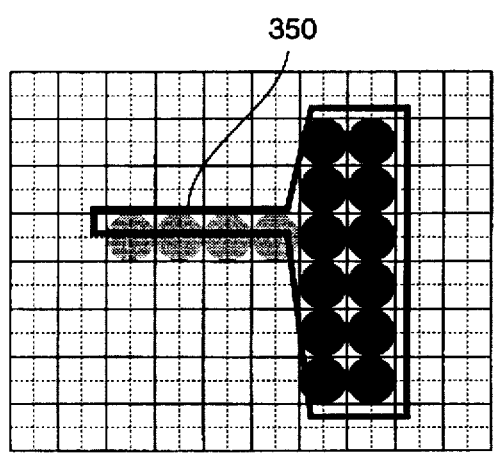
FIGS. 18a, 18b, 18c and 18d illustrate details of dropout conditions.
Figure 18B:
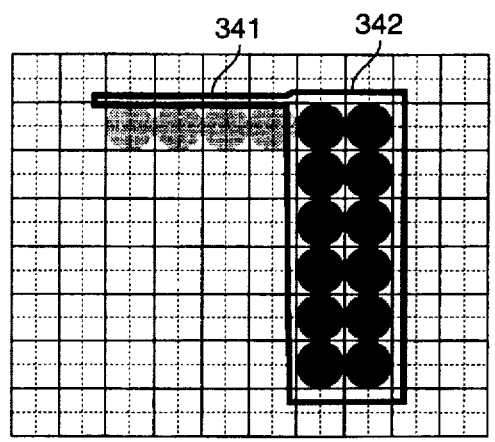
Figure 18C:
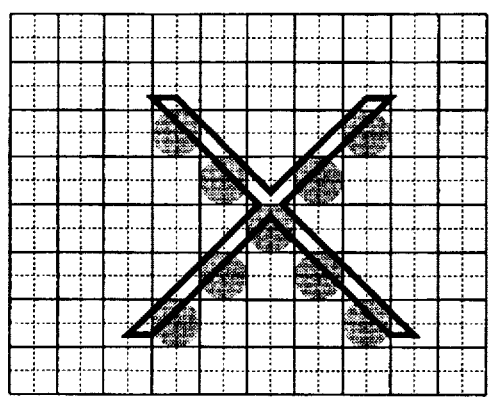
Figure 18D:
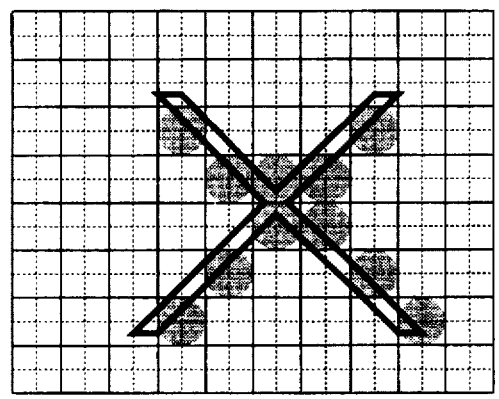

1) Dual dropout rule—If there are dual dropouts, the choice of dropout pixels must be properly phased. Referring to FIGS. 18c and 18d, this is done by choosing the pixels that fall below (or above, according to convention, since the specific rule is not critical) the actual dropout crosses. YDropout fixup will only be employed when there is no XDropout between the same pixel and the one below it. Also XDropout fixup will only be employed when there is no YDropout between the same pixel and the one to its right. This will assure that the "clumps" of pixels shown FIG. 18d do not occur.

2) Defining feature rule—When an XDropout condition occurs, look to the left and right for pixels that were set using normal center-point fill rules. If one is found, such as pixel 342 next to feature 341 (FIG. 18b), determine which row of pixels it is in, and use that row for the XDropout fix pixel.

3) Majority coverage rule—If no defining feature is found or there is a defining feature both above and below the dropout row, look to see which row is covered by a majority of the contour. For feature 350 (FIG. 18a), it is the row of pixels below the dropout.

4) If none of the above rules apply, arbitrarily select either pixel to set. The selection should be consistent, e.g. always the top pixel.

To fix a collision, apply analogous rules starting with a dual collision rule to decide which pixel to set white.

A general description of the device and method of the present invention as well as a preferred embodiment of the present invention has been set forth above. One skilled in the art will be able to practice variations in the methods described and make modifications to the apparatus described, all of which fall within the scope of the teachings of this invention, which should only be limited as set forth in the claims which follow.

What is claimed is:

1. A method of determining the flatness of a first cubic Bezier curve having a first set of four control points having coordinates, two of said control points being endpoints and the remaining control points being internal, in preparation for displaying the cubic Bezier curve on a raster display, comprising:

determining whether said first cubic Bezier curve can be approximated by a straight line segment, such approximation being possible if the distances between the x and y values of a selected one of said internal control points and the respective x and y values of a selected endpoint are within a flatness factor of ⅓ of the distance between the respective x and y values of the coordinates of said two endpoints upon determining that said first cubic Bezier curve can be approximated by a straight line segment, outputting said straight line segment, upon determining that said first cubic Bezier curve cannot be approximated by a straight line segment, dividing said first cubic Bezier curve approximately at its midpoint into second and third cubic Bezier curves and calculating a second and third set of control points for each of said second and third cubic Bezier curves, wherein at least one control point of each of said second and third sets of control points substantially coincides with one control point of said first cubic Bezier curve;

when said second and third cubic Bezier curves cannot be approximated by straight line segments, repeating the process of subdividing for either of said second and third cubic Bezier curves which cannot be so approximated, continuing iteratively until all cubic Bezier curves can be approximated by straight line segments; and displaying the approximated straight line segments on said raster display.

2. A method for displaying rasterized objects comprising:

accessing outline data from a computer memory or storage medium, said outline data representing said object in a first coordinate space, deriving from said outline data representing said object in a first coordinate space data corresponding to said outline data, the derived data representing said object in a second coordinate space;

flattening curved portions of said data representing said object in said second coordinate space into a plurality of straight lines;

generating a plurality of line segments from said straight lines;

identifying all of said plurality of line segments that cross a midline through the center of a pixel;

identifying the pixels to be used to display said object by selecting all the pixels whose midlines have been identified to have been crossed by one of said plurality of line segments; and storing the identified pixels to be used to display said object in computer memory for subsequent display or displaying said pixels on a raster printing or a raster display device.

3. Apparatus for determining the flatness of a first cubic Bezier curve having a first set of four control points having coordinates, two of said control points being endpoints and the remaining control points being internal, in preparation for displaying the cubic Bezier curve on a raster display, comprising:

means for determining whether said first cubic Bezier curve can be approximated by said straight line segment, such approximation being possible if the distance between the x and y values of a selected one of said internal control points and the respective x and y values of a selected endpoint are within a flatness factor of ⅓ of the distance between the respective x and y values of the coordinates of said two endpoints;

means for outputting said straight line segment upon determining that said first cubic Bezier curve can be approximated by said straight line segment;

means for dividing said first cubic Bezier curve approximately at its midpoint into second and third cubic Bezier curves and calculating a second and third set of control points for each of said second and third cubic Bezier curves upon determining that said first cubic Bezier curve cannot be approximated by a straight line segment, wherein at least one control point of each of said second and third sets of control points substantially coincides with one control point of said first cubic Bezier curve;

means for repeating, when said second and third cubic Bezier curves cannot be approximated by straight line segments, the process of subdividing for either of said second and third cubic Bezier curves which cannot be so approximated, continuing iteratively until all cubic Bezier curves can be approximated by straight line segments; and means for displaying the approximated straight line segments on said raster display.

4. Apparatus for displaying rasterized objects comprising:

means for accessing outline data from a computer memory or storage medium, said outline data representing said object in a first coordinate space, means for deriving from said outline data representing said object in a first coordinate space data corresponding to said outline data, the derived data representing said object in a second coordinate space;

means for flattening curved portions of said data representing said object in said second coordinate space into a plurality of straight lines;

means for generating a plurality of line segments from said straight lines;

means for identifying all of said plurality of line segments that cross a midline through the center of a pixel;

means for identifying the pixels to be used to display said object by selecting all pixels whose midlines have been identified to have been crossed by one of said plurality of line segments; and means for storing the identified pixels to be used to display said object in computer memory for subsequent display or displaying said pixels on a raster printing or a raster display device.

* * * * *

UNITED STATES PATENT AND TRADEMARK OFFICE
CERTIFICATE OF CORRECTION

PATENT NO. : 5,857,067

DATED : 1/5/99

INVENTOR(S) : Christopher R. Hassett, et al.

It is certified that error appears in the above-identified patent and that said Letters Patent is hereby corrected as shown below: On the title page, Item [57], Line 1 of the abstract, after "apparatus" insert --for--; delete "convert" and substitute --converting--; line 5, delete "corrdinate" and substitute --coordinate--; line 6, delete "corrdinate" and substitute --coordinate--.

Signed and Sealed this

Twenty-second Day of June, 1999

Attest:

Q. TODD DICKINSON

*Attesting Officer*    Acting Commissioner of Patents and Trademarks